(12) United States Patent
Fushimi

(10) Patent No.: US 6,683,944 B2
(45) Date of Patent: Jan. 27, 2004

(54) VOICE TRANSMITTER

(75) Inventor: Wataru Fushimi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 127 days.

(21) Appl. No.: 10/087,755

(22) Filed: Mar. 5, 2002

(65) Prior Publication Data
US 2002/0141552 A1 Oct. 3, 2002

(30) Foreign Application Priority Data
Mar. 30, 2001 (JP) ........................................ 2001-101569

(51) Int. Cl.[7] .............................................. H04M 11/00
(52) U.S. Cl. ................... 379/93.26; 379/93.31
(58) Field of Search ........................... 379/93.26, 93.28, 379/93.31, 93.34, 93.08, 93.01, 93.33

(56) References Cited

FOREIGN PATENT DOCUMENTS

| EP | 0 579 927 | 1/1994 |
|---|---|---|
| EP | 1 059 782 | 12/2000 |
| JP | 8-307366 A | 11/1996 |
| JP | 2000-358260 | 12/2000 |

*Primary Examiner*—Stella Woo
(74) *Attorney, Agent, or Firm*—Birch, Stewart, Kolasch & Birch, LLP

(57) ABSTRACT

A voice transmitter includes a first selector for selecting an output of DTMF encoding means or that of voice-DTMF encoding means; DTMF transmission control means for monitoring each state, and for controlling selecting operation of the first selector; DTMF detecting means; and a second selector for selecting an output of voice encoding means or an output signal selected by the first selector by the DTMF detecting means.

20 Claims, 16 Drawing Sheets

VOICE TRANSMITTER

BACKGROUND OF THE INVENTION

1. Field of the Invention

The present invention relates to a voice transmitter for transmitting an audio signal and a DTMF signal (Dual Tone Multi-Frequency) by high-efficiency voice encoding technology.

2. Description of Related Art

FIG. 27 is a block diagram showing a conventional voice transmitter.

Referring to FIG. 27, reference numeral 8 denotes an input terminal of the voice transmitter; 9 an output terminal of the voice transmitter; 10 a voice encoding unit for encoding an audio signal; 11 a DTMF encoding unit for encoding a DTMF signal; 12 a DTMF detecting unit for detecting and judging whether or not an input signal is a DTMF signal; and 13 a selector for selecting an output of the voice encoding unit 10 or that of the DTMF encoding unit 11 under the control of the DTMF detecting unit 12, and for outputting either of them.

Next, the operation of the conventional voice transmitter will be described.

In the voice encoding unit 10 and the DTMF encoding unit 11, an inputted audio signal or a DTMF signal is encoded into digital data string. The voice encoding unit 10 encodes the signal by voice encoding technology. In addition, the DTMF encoding unit 11 decodes the DTMF audio signal into a DTMF numerical value. On the other hand, the DTMF detecting unit 12 detects and judges whether or not an input signal is a DTMF signal. If the input signal is a DTMF signal, the DTMF detecting unit 12 controls the selector 13 so that the output of the DTMF encoding unit 11 is selected. Otherwise, the DTMF detecting unit 12 controls the selector 13 so that the output of the voice encoding unit 10 is selected. The selector 13 selects an input signal in response to an instruction from the DTMF detecting unit 12, and then outputs the selected signal to the transmission line side.

FIG. 28 is a block diagram showing a conventional voice encoder described in JP-A No. 8-307366.

Referring to FIG. 28, reference numeral 111 denotes an input terminal; 112 a DTMF detection circuit for detecting and judging whether or not a signal, which is inputted by the input terminal 111, is a DTMF signal; 113 a DTMF encoder for encoding a DTMF signal; and 114 a voice encoder for encoding an audio signal. Reference numeral 112a denotes a switching circuit for selecting an output to the voice encoder 114 or that to the DTMF encoder 113, and for outputting either of them under the control of the DTMF detection circuit 112. Reference numeral 115 denotes an output selecting circuit for selecting an output of the voice encoder 114 or that of the DTMF encoder 113 under the control of the DTMF detection circuit 112, and for transmitting the selected output to an output terminal 116.

Next, the operation of the conventional voice encoder will be described.

In the DTMF signal detecting circuit 112, an inputted audio signal or a DTMF signal is judged whether or not it is a DTMF signal. The switching circuit 112a, which is notified that the signal is a DTMF signal, connects an input signal from the input terminal 111 to the DTMF encoder 113. The DTMF signal, which is given to the DTMF encoder 113, is encoded (i.e., decoded), is converted into a DTMF numerical value, and is then output as an encoded DTMF signal. Moreover, the output selecting circuit 115, which is notified that the signal is a DTMF signal, selects the output from the DTMF encoder 113 and outputs it to the output terminal 116. On the other hand, if the DTMF detecting circuit 112 judged the signal not to be a DTMF signal, each of the switching circuit 112a and the output selecting circuit 115, which is notified that the signal is not a DTMF signal, connects an input signal from the input terminal 111 to the voice encoder 114, selects an output from the voice encoder 114, and then outputs it to the output terminal 116. In this case, the input signal is voice-encoded in the voice encoder 114, and is output as an encoded audio signal.

Since the conventional voice transmitter and the voice encoder are configured as described above, if the transmitter detected and judged false an audio signal to be a DTMF signal during a telephone conversation, an output signal, which is decoded in the DTMF encoding unit 11 or in the DTMF encoder 113, will be transmitted to a destination equipment. Thus, the destination side equipment, which is received this signal, is obliged to generate a DTMF signal based on the decoded signal. As a result, a destination caller will hear suddenly a sound of the DTMF signal, which gives an unpleasant feeling to the caller.

SUMMARY OF THE INVENTION

The present invention has been made to solve the above problems, and an object thereof is to provide a high-quality voice transmitter, which does not give an unpleasant feeling to a caller, even when the transmitter detected and judged false an audio signal to be a DTMF signal during a telephone conversation, and which can transmit the a signal reliably when the DTMF signal is actually transmitted.

A voice transmitter according to the present invention for encoding and transmitting a DTMF signal and an audio signal, includes:

voice encoding means for performing voice-encoding of an inputted audio signal;

DTMF encoding means for performing encoding of an inputted DTMF signal;

voice-DTMF encoding means for performing voice encoding of an inputted audio signal and a DTMF signal;

a first selector for selecting the DTMF signal encoded in the DTMF encoding means, or the DTMF signal voice-encoded in the voice-DTMF encoding means;

DTMF transmission control means for monitoring quality of an input signal and a transmission line, congestion of the transmitter, or a call connection, and for controlling selecting operation of the first selector depending on the state;

DTMF detecting means for detecting that an inputted signal is a DTMF signal; and second selector for selecting an output of the voice encoding means when the DTMF detecting means judged the inputted signal not to be a DTMF signal, and for selecting an output signal selected by the first selector when the DTMF detecting means judged the inputted signal to be a DTMF signal.

In the voice transmitter according to the present invention, the voice-DTMF encoding means voice-encodes both an audio signal and a DTMF signal at a higher speed than a voice-encoding speed of the voice encoding means.

In the voice transmitter according to the present invention, the voice-DTMF encoding means incorporates an encoding algorithm, which is specialized in a DTMF signal, and encodes the DTMF signal of poor voice quality at the same speed as a voice-encoding speed.

In the voice transmitter according to the present invention, the DTMF transmission control means is call connection state monitoring control means for monitoring a call connection state, and for, depending on the call connection state, controlling the first selector to select either an output of a DTMF encoding unit or that of a voice-DTMF encoding unit for a DTMF signal transmission.

In the voice transmitter according to the present invention, the DTMF transmission control means is input-signal quality monitoring control means for monitoring quality of an inputted audio signal and a DTMF signal, and for, depending on the quality, controlling the first selector to select either the DTMF encoding means or the voice-DTMF encoding means for a DTMF signal transmission.

In the voice transmitter according to the present invention, the DTMF transmission control means is transmission-line quality monitoring control means for monitoring transmission quality on a transmission line, and for, depending on the transmission-line quality, controlling the first selector to select either the DTMF encoding means or the voice-DTMF encoding means for a DTMF signal transmission.

In the voice transmitter according to the present invention, the transmission-line quality monitoring control means is data-error-rate monitoring control means for monitoring a data error rate on a transmission line, and for, depending on the data error rate, controlling the first selector to select either the DTMF encoding means or the voice-DTMF encoding means for a DTMF signal transmission.

In the voice transmitter according to the present invention, the transmission-line quality monitoring control means is IP-packet loss-rate monitoring control means for monitoring an IP packet loss rate on the transmission line, and for, depending on the IP-packet loss-rate, controlling the first selector to select either the DTMF encoding means or the voice-DTMF encoding means for a DTMF signal transmission.

In the voice transmitter according to the present invention, the transmission-line quality monitoring control means is IP-packet delay-variation-quantity monitoring control means for monitoring incoming delay variation quantity of IP packet on a transmission line, and for, depending on the incoming delay variation quantity, controlling the first selector to select either the DTMF encoding means or the voice-DTMF encoding means for a DTMF signal transmission.

In the voice transmitter according to the present invention, the transmission-line quality monitoring control means is ATM cell loss-rate monitoring control means for monitoring an ATM cell loss rate on a transmission line, and for, depending on the ATM cell loss rate, controlling the first selector to select either the DTMF encoding means or the voice-DTMF encoding means for a DTMF signal transmission.

In the voice transmitter according to the present invention, the transmission-line quality monitoring control means is ATM cell delay-variation monitoring control means for monitoring an ATM cell loss rate on a transmission line and ATM cell incoming delay variation quantity on the transmission line, and for, depending on the ATM cell incoming delay-variation-quantity, controlling the first selector to select either the DTMF encoding means or the voice-DTMF encoding means for a DTMF signal transmission.

In the voice transmitter according to the present invention, the DTMF transmission control means is transmitter congestion state monitoring control means for monitoring a congestion state in the transmitter, and for, depending on the congestion state, controlling the first selector to select either the DTMF encoding means or the voice-DTMF encoding means for a DTMF signal transmission.

In the voice transmitter according to the present invention, the transmitter congestion state monitoring control means is freeze out ratio monitoring control means for monitoring a freeze out ratio, which is caused by congestion of an audio signal to be transmitted in the transmitter, and for, depending on the freeze out ratio, controlling the first selector to select either the DTMF encoding means or the voice-DTMF encoding means for a DTMF signal transmission.

A voice transmitter according to the present invention for encoding a DTMF signal and an audio signal and for transmitting the signals, includes voice encoding means for performing voice-encoding of an inputted audio signal;

DTMF encoding means for performing encoding of an inputted DTMF signal;

first voice-DTMF encoding means for performing voice encoding of an inputted audio signal and a DTMF signal;

a second voice-DTMF encoding means for performing voice encoding of an inputted audio signal and a DTMF signal, and for outputting the encoded data, which is encoded at a higher speed and is of better quality than those of the first voice-DTMF encoding means;

first selector for selecting a DTMF signal encoded in the DTMF encoding means, a DTMF signal voice-encoded in the first voice-DTMF encoding means, or a DTMF signal voice-encoded in the second voice-DTMF encoding means;

DTMF transmission control means for monitoring quality of an inputted signal and a transmission line, congestion of the transmitter, or a call connection, etc., and for controlling selecting operation of the first selector depending on the monitored result;

DTMF detecting means for detecting that an inputted signal is a DTMF signal; and a second selector for selecting an output of the voice encoding means when the DTMF detecting means judged the inputted signal not to be a DTMF signal, and for selecting an output signal selected by the first selector when the DTMF detecting means judged the inputted signal to be a DTMF signal.

In the voice transmitter, the DTMF transmission control means includes transmission-line quality monitoring control means for monitoring transmission quality of a transmission line, and for, depending on the transmission line quality, controlling the first selector to select an output of the first voice-DTMF encoding means or that of the second voice-DTMF encoding means is selected in a first step; and call connection state monitoring control means for monitoring a call connection state, and for, depending on the call connection state, controlling the first selector so that an output of the DTMF encoding means, or that of the first or the second voice-DTMF encoding means, which is selected in the first step, is selected in a second step for a DTMF signal transmission.

In the voice transmitter according to the present invention, the DTMF transmission control means includes
  transmitter congestion state monitoring control means for monitoring a congestion state in the transmitter, and for, depending on the congestion state, controlling the first selector so that an output of the first voice-DTMF encoding means or that of the second voice-DTMF encoding means is selected in a first step; and
  call connection state monitoring control means for monitoring a call connection state, and for, depending on the call connection state, controlling the first selector so that an output of the DTMF encoding means, or that of the first or the second voice-DTMF encoding means, which is selected in the first step, is selected in a second step for a DTMF signal transmission.

In the voice transmitter according to the present invention, the DTMF transmission control means includes:
  transmission-line quality monitoring control means for monitoring transmission quality of a transmission line, and for, depending on the transmission quality, controlling the first selector so that an output of the first voice-DTMF encoding means or that of the second voice-DTMF encoding means is selected in a first step; and
  input-signal quality monitoring control means for monitoring quality of an inputted audio signal and a DTMF signal, and for, depending on the quality, controlling the first selector so that an output of the DTMF encoding means, or that of the first or the second voice-DTMF encoding means, which is selected in the first step, is selected in a second step for a DTMF signal transmission.

In the voice transmitter according to the present invention, the DTMF transmission control means includes
  transmission congestion state monitoring control means for monitoring a congestion state in the transmission, and for, depending on the congestion state, controlling the first selector so that an output of the first voice-DTMF encoding means or that of the second voice-DTMF encoding means is selected in a first step; and
  input-signal quality monitoring control means for monitoring quality of an inputted audio signal and a DTMF signal, and for, depending on the quality, controlling the first selector so that an output of the DTMF encoding means, or that of the first or the second voice-DTMF encoding means, which is selected in the first step, is selected in a second step for a DTMF signal transmission.

In the voice transmitter according to the present invention, the DTMF transmission control means is transmission-line quality monitoring control means for monitoring transmission quality of a transmission line, and for, depending on the detected level of the transmission quality, controlling the first selector so that an output is selected from any one of those including the first voice-DTMF encoding means, the second voice-DTMF encoding means, and the DTMF encoding means.

In the voice transmitter according to the present invention, the DTMF transmission control means is transmitter congestion state monitoring control means for monitoring a congestion state in the transmitter, and for, depending on the detected level of the congestion state, controlling the first selector so that an output is selected from any one of those including the first voice-DTMF encoding means, the second voice-DTMF encoding means, and the DTMF encoding means.

DETAILED DESCRIPTION OF THE PREFERRED EMBODIMENTS

Preferred embodiments of the present invention will be described in detail with reference to the accompanied drawings.

First Embodiment

Figure 1:
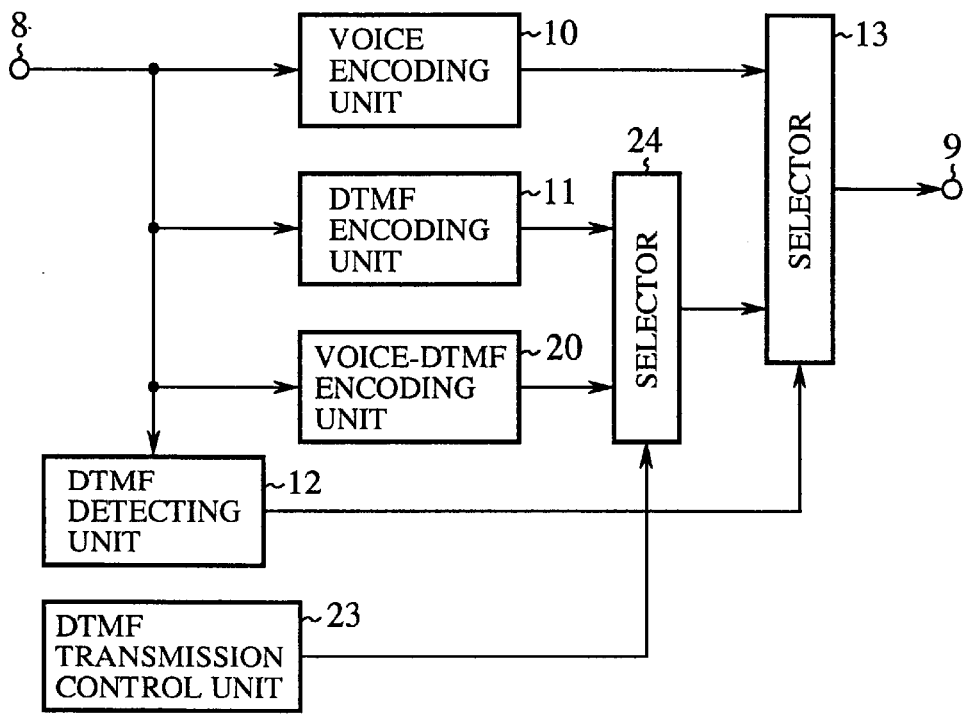
FIG. 1 is a block diagram showing a voice transmitter according to a first embodiment of the present invention.

FIG. 1 is a block diagram showing a voice transmitter according to a first embodiment of the present invention.

Referring to FIG. 1, reference numeral 8 denotes an input terminal of the voice transmitter; 9 an output terminal of the voice transmitter; 10 a voice encoding unit (voice encoding means) for performing voice encoding of an inputted audio signal; 11 a DTMF encoding unit (DTMF encoding means) for performing encoding of an inputted DTMF signal; and 20 a voice-DTMF encoding unit (voice-DTMF encoding means) for performing encoding of an inputted audio signal and a DTMF signal. Reference numeral 12 denotes a DTMF detecting unit (DTMF detecting means) for detecting and judging whether or not an inputted signal is a DTMF signal. Reference numeral 23 denotes a DTMF transmission control unit (DTMF transmission control means) for monitoring quality of an input signal and a transmission line, congestion of the transmitter, or a call connection, etc., and for, depending on the detected result, outputting a control signal for selecting and controlling either the DTMF encoding unit 11 or the voice-DTMF encoding unit 20 for a DTMF signal transmission. Reference numeral 24 denotes a selector (a first selector) for selecting an output of the DTMF encoding unit 11 or that of the voice-DTMF encoding unit 20 in response to an instruction from the DTMF transmission control unit 23, and for outputting the selected output. Reference numeral 13 denotes a selector (a second selector) for selecting an output of the voice encoding unit 10 or that of the selector 24 in response to an instruction from the DTMF detecting unit 12, and for outputting the selected output.

Next, the operation of the first embodiment will be described.

When a signal is inputted from the input terminal 8, an audio signal is voice-encoded in the voice encoding unit 10. Additionally, in the DTMF encoding unit 11, a DTMF audio signal is decoded into a DTMF numerical value. In the voice-DTMF encoding unit 20, the DTMF audio signal is voice-encoded as an audio signal. The DTMF transmission control unit 23 monitors quality of an input signal and a transmission line, congestion of the transmitter, or a call connection, etc. Depending on the detected result, the DTMF transmission control unit 23 controls the selector 24 so that an output of the DTMF encoding unit 11 or that of the voice-DTMF encoding unit 20 is appropriately selected. If the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on a transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20 is output to the output terminal 9 on a transmission line side.

Alternatively, it is to be noted that an encoding means, which is able to transmit both a DTMF and voice, and encodes at a higher speed than that of the voice encoding unit 10, may be used as the voice-DTMF encoding unit 20.

In addition, an encoding means may also be used as the voice-DTMF encoding unit 20, incorporated an encoding algorithm, which is specialized in a DTMF signal, encodes at the same speed as that of the voice encoding unit, and transmits a DTMF signal of more poor voice quality than that of the voice encoding unit.

As described above, according to the first embodiment, since the DTMF transmission means can be selectively controlled appropriately, it is possible to realize high-quality transmission. This does not give an unpleasant feeling to a caller, even when a DTMF signal is detected false during a telephone conversation, and reliably transmits a DTMF signal, when the DTMF signal is actually transmitted.

Second Embodiment

Figure 2:
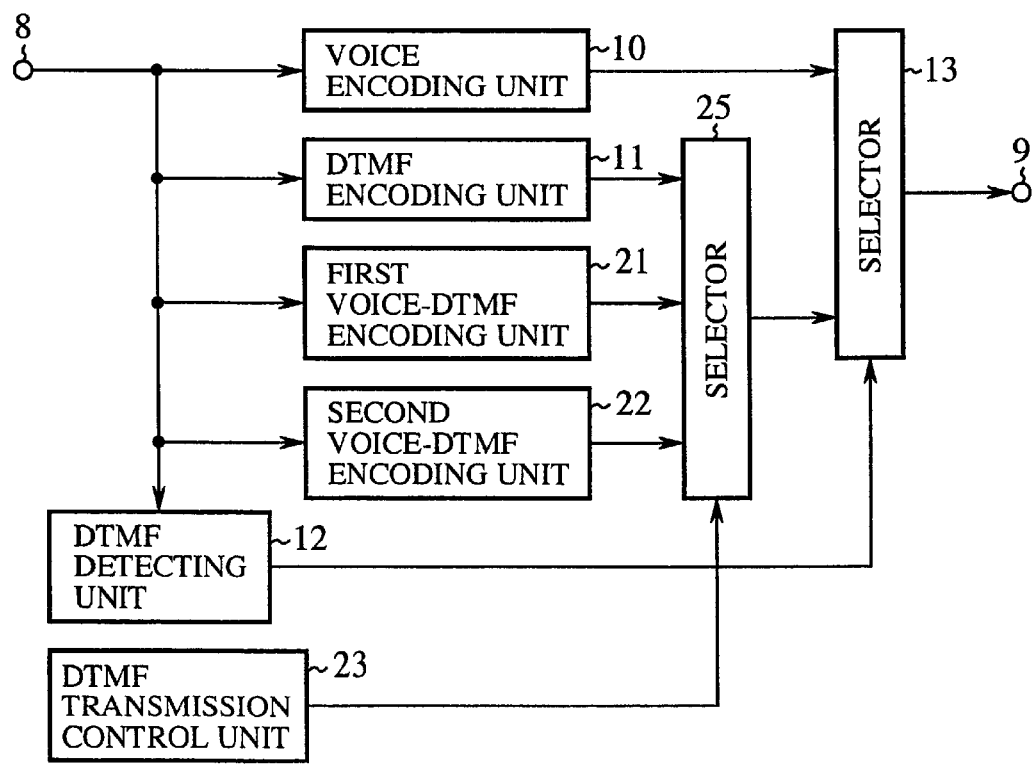
FIG. 2 is a block diagram showing a voice transmitter according to a second embodiment of the present invention.

FIG. 2 is a block diagram showing a voice transmitter according to a second embodiment of the present invention.

Referring to FIG. 2, reference numeral 8 denotes an input terminal of the voice transmitter; 9 an output terminal of the voice transmitter; and 10 a voice encoding unit for voice-encoding an audio signal (voice encoding means). Reference numeral 11 denotes a DTMF encoding unit for performing encoding of a DTMF signal (DTMF encoding means); 21 denotes a first voice-DTMF encoding unit (first voice-DTMF encoding means) for performing encoding of an audio signal and a DTMF signal; and 22 denotes a second voice-DTMF encoding unit (second voice-DTMF encoding means) for performing encoding of an audio signal and a DTMF signal. Here, assumed that the second voice-DTMF encoding unit 22 is an encoding unit which encodes at a higher speed and outputs an encoded data of better quality than those of the first voice-DTMF encoding unit 21. Reference numeral 12 denotes a DTMF detecting unit for detecting and judging whether or not an inputted signal is a DTMF signal. Reference numeral 23 denotes a DTMF transmission control unit (DTMF transmission control means) for monitoring quality of an input signal and a transmission line, congestion of the transmitter, or a call connection, etc., and for, depending on the detected result, selectively controlling a selector 25 to select a unit from any one of those including the DTMF encoding unit 11, the first voice-DTMF encoding unit 21, and the second voice-DTMF encoding unit 22 for a DTMF signal transmission. Reference numeral 25 denotes a selector (the first selector) for, in response to an instruction from the DTMF transmission control unit 23, selectively outputting an output from any one of those including the DTMF encoding unit 11, the first voice-DTMF encoding unit 21, and the second voice-DTMF encoding unit 22. Reference numeral 13 is a selector (a second selector) for selecting an output of the voice encoding unit 10 or that of the selector 25 in response to an instruction from the DTMF detecting unit 12.

Next, the operation of the second embodiment will be described.

When a signal is inputted to the input terminal 8, an audio signal is voice-encoded in the voice encoding unit 10. In addition, the DTMF encoding unit 11 decodes a DTMF audio signal into a DTMF numerical value. Moreover, in the first voice-DTMF encoding unit 21 and in the second voice-DTMF encoding unit 22, the DTMF audio signal is voice-encoded as an audio signal. The DTMF transmission control unit 23 monitors quality of an input signal and a transmission line, congestion of the transmitter, or a call connection, etc. Depending on the detected result, the DTMF transmission control unit 23 controls the selector 25 so that an output is selected appropriately from any one of those including the DTMF encoding unit 11, the first voice-DTMF encoding unit 21, and the second voice-DTMF encoding unit 22. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the transmission line side (output terminal) 9. If the DTMF detecting unit 12 judged the input signal to be a DTMF signal, the selector 13 selects the DTMF output signal of the selector 25, and outputs it to the transmission line side (output terminal) 9. To be more specific, in this case, the DTMF signal output will be the DTMF signal encoded or voice-encoded in any one of those including the DTMF encoding unit 11, the first voice-DTMF encoding unit 21, and the second voice-DTMF encoding unit 22.

As described above, according to the second embodiment, since the DTMF transmission means is selectively controlled appropriately, it is possible to realize high-quality transmission. This does not give an unpleasant feeling to a caller, even when a DTMF signal is detected false during a telephone conversation, and reliably transmits a DTMF signal when the DTMF signal is actually transmitted.

Third Embodiment

Figure 3:
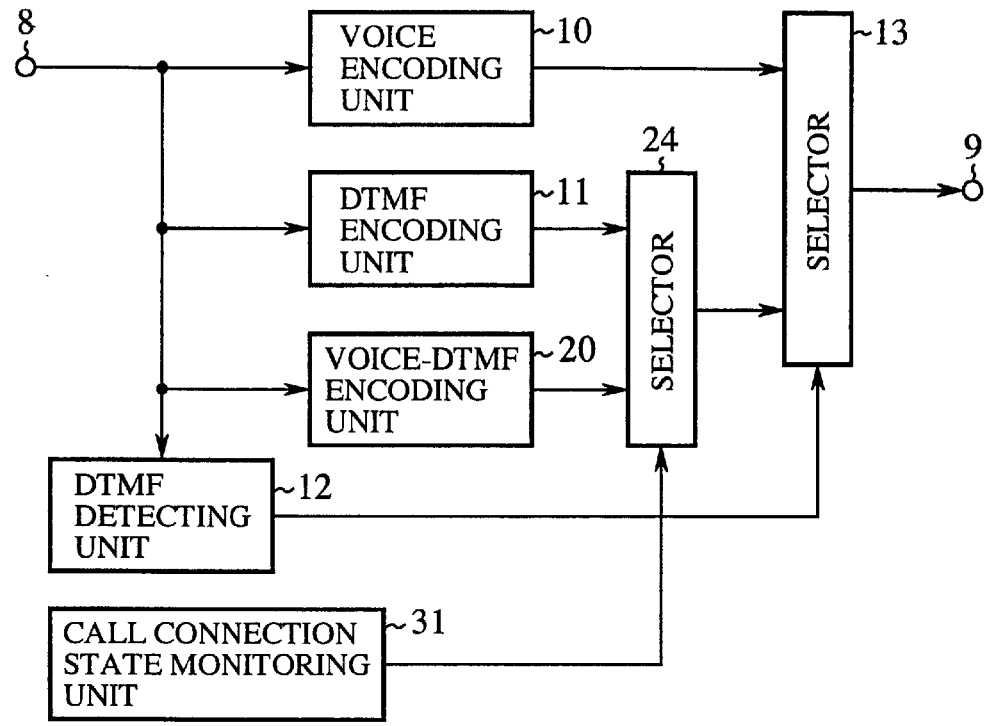
FIG. 3 is a block diagram showing a voice transmitter according to a third embodiment of the present invention.

FIG. 3 is a block diagram showing a voice transmitter according to a third embodiment of the present invention.

Referring to FIG. 3, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal; and reference numeral 12 denotes a DTMF detecting unit for detecting and judging whether or not an input signal is a DTMF signal. Reference numeral 31 denotes a call connection state monitoring unit (call connection state monitoring control means) for monitoring a connection state of call, and for outputting a control signal for selecting and controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the call connection state monitoring unit 31, and for outputting the selected output; and 13 denotes a selector for selecting an output of the voice encoding unit 10 or that of the selector 24 in response to an instruction from the DTMF detecting unit 12, and for outputting the selected output.

Next, the operation of the third embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The call connection state monitoring unit 31 monitors a call connection state, and controls the selector 24 so that if the current state is in the course of the call connection sequence in which a telephone conversation is not yet started, an output of the DTMF encoding unit 11 is selected, and that if the current state is busy in which the call connection sequence has already been finished, an output of the voice-DTMF encoding unit 20 is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the third embodiment, using the call connection state monitoring unit 31 as the DTMF transmission control unit 23 of the first embodiment, and selecting the voice-DTMF encoding unit 20 during a telephone conversation achieves high-quality transmission. This does not give an unpleasant feeling to a caller, even when a DTMF signal is detected false, as the DTMF signal is transmitted in the same manner as an audio signal, and reliably transmits the DTMF signal, as the DTMF encoding unit 11 is selected to decode the DTMF signal, when a DTMF is actually transmitted during a call connection sequence.

Fourth Embodiment

Figure 4:
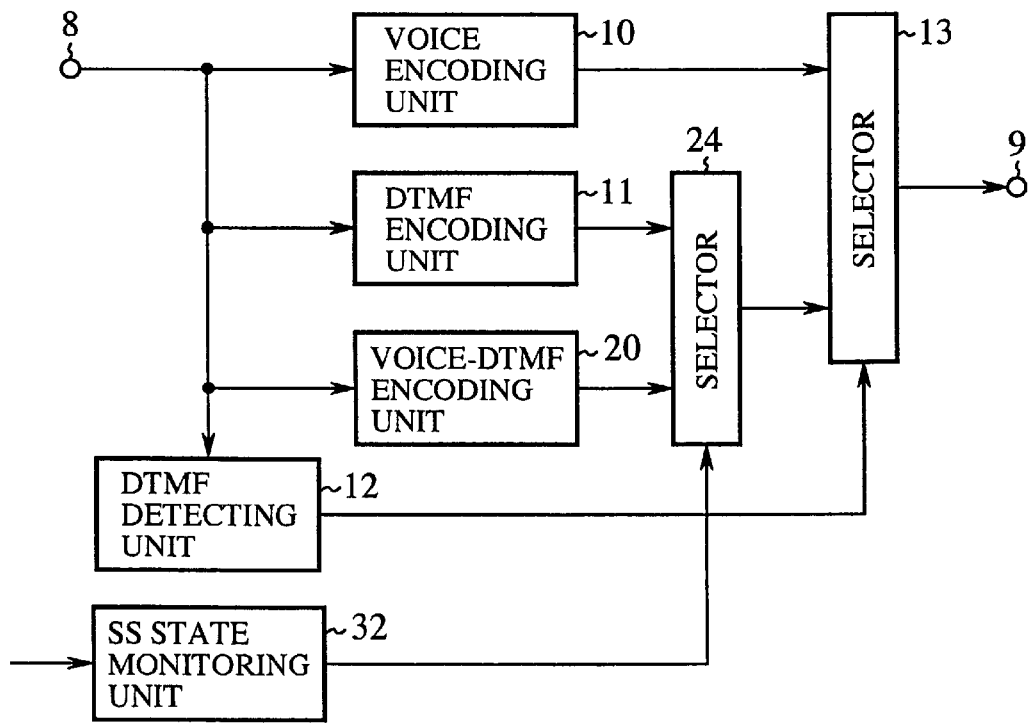
FIG. 4 is a block diagram showing a voice transmitter according to a fourth embodiment of the present invention.

FIG. 4 is a block diagram showing a voice transmitter according to a fourth embodiment of the present invention.

Referring to FIG. 4, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal, and 12 denotes a DTMF detecting unit for detecting and judging whether or not an input signal is a DTMF signal. Reference numeral 32 denotes an SS state monitoring unit (SS state monitoring control means) for monitoring SS signaling information, which is a transmission-side signaling, and for outputting a control signal for selectively controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the SS state monitoring unit 32, and for outputting the selected output; and 13 denotes a selector for selecting an output of the voice encoding unit 10 or that of the selector 24 in response to an instruction from the DTMF detecting unit 12, and for outputting the selected output.

Next, the operation of the fourth embodiment will be described.

When a signal is inputted from the input terminal 8, an audio signal is voice-encoded in the voice encoding unit 10. In addition, in the DTMF encoding unit 11, a DTMF audio signal is decoded into the DTMF numerical value. In the voice-DTMF encoding unit 20, a DTMF audio signal is voice-encoded as an audio signal. The SS state monitoring unit 32 monitors the SS signaling information and controls the selector 24 so that, during a fixed time period after the SS signaling information became ON, the current state is in the course of the calling connection sequence in which a telephone conversation is not yet started, and selects an output of the DTMF encoding unit 11. Moreover, after a lapse of the fixed time period after the SS signaling information became ON, the SS state monitoring unit 32 judges the current state to be busy in which the call connection sequence has already been finished, and then controls the selector 24 so that an output of the voice-DTMF encoding unit 20 is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the fourth embodiment, using the SS state monitoring unit 32 as the call connection state monitoring unit 31 of the third embodiment, and selecting and controlling the voice-DTMF encoding unit 20 during a telephone conversation achieves high-quality transmission. This does not give an unpleasant feeling to a caller, even when a DTMF signal is detected false, as the DTMF signal is transmitted in the same manner as an audio signal, and reliably transmits the DTMF signal, as the DTMF encoding unit 11 is selected to decode the DTMF signal, when a DTMF signal is actually transmitted during a call connection sequence.

Fifth Embodiment

Figure 5:
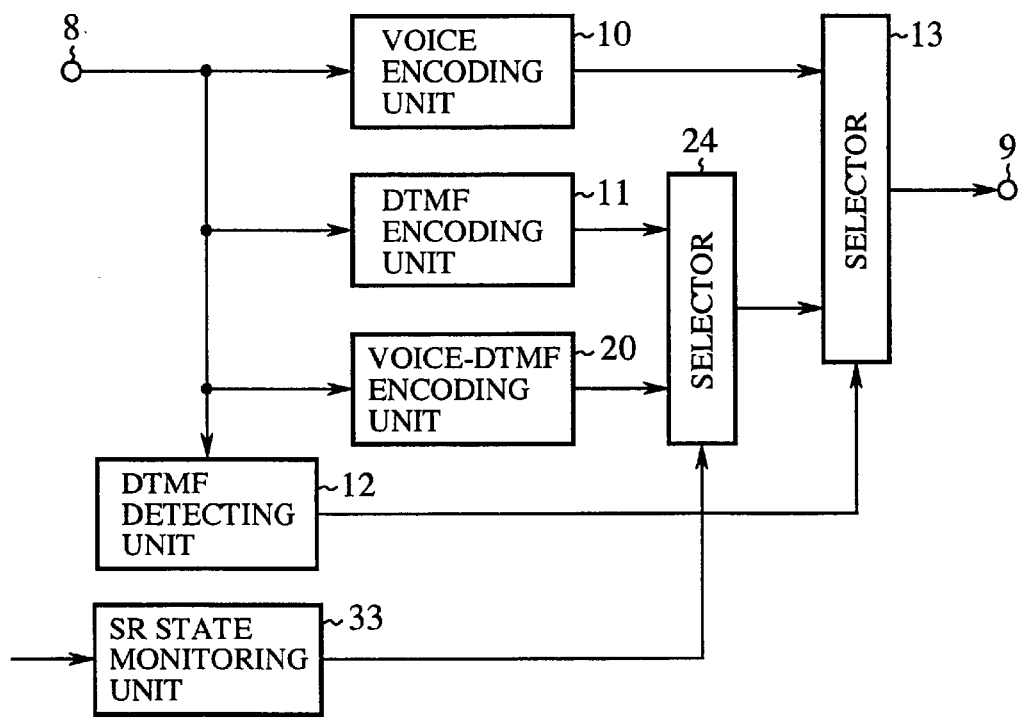
FIG. 5 is a block diagram showing a voice transmitter according to a fifth embodiment of the present invention.

FIG. 5 is a block diagram showing a voice transmitter according to a fifth embodiment of the present invention.

Referring to FIG. 5, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding for performing encoding of an inputted audio signal and a DTMF signal; and 12 denotes a DTMF detecting unit for detecting and judging whether or not an inputted signal is a DTMF signal. Reference numeral 33 denotes an SR state monitoring unit (SR state monitoring control means) for monitoring SR signaling information, which is a receiving-side signaling, and for outputting a control signal for selecting and controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the SR state monitoring unit 33, and for outputting the selected output. Reference numeral 13 denotes a selector for selecting an output of the voice encoding unit 10 or that of the selector 24 in response to an instruction from the DTMF detecting unit 12, and for outputting the selected output.

Next, the operation of the fifth embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The SR state monitoring unit 33 monitors the SR signaling information, and controls the selector 24 so that, when the SR signaling information is OFF, the current state is judged to be in the course of the call connection sequence in which the call connection sequence is not yet started, an output of the DTMF encoding unit 11 is selected. Moreover, when the SR signaling information is ON, the SR state monitoring unit 33 judged the current state to be busy in which the call connection sequence has already been finished, and then controls the selector 24 so that an output of the voice-DTMF encoding unit 20 is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20 is output to the output terminal 9 on the transmission line side.

As described above, according to the fifth embodiment, using the SR state monitoring unit 33 as the call connection state monitoring unit 31 of the third embodiment, and selectively controlling the voice-DTMF encoding unit 20 during a telephone conversation achieves high-quality transmission. This does not give an unpleasant feeling to a caller, even when a DTMF signal is detected false, as a DTMF signal is transmitted in the same manner as an audio signal, and reliably transmits the DTMF signal, as the DTMF encoding unit 11 is selectively controlled to decode the DTMF signal, when a DTMF signal is actually transmitted during the call connection sequence.

Sixth Embodiment

Figure 6:
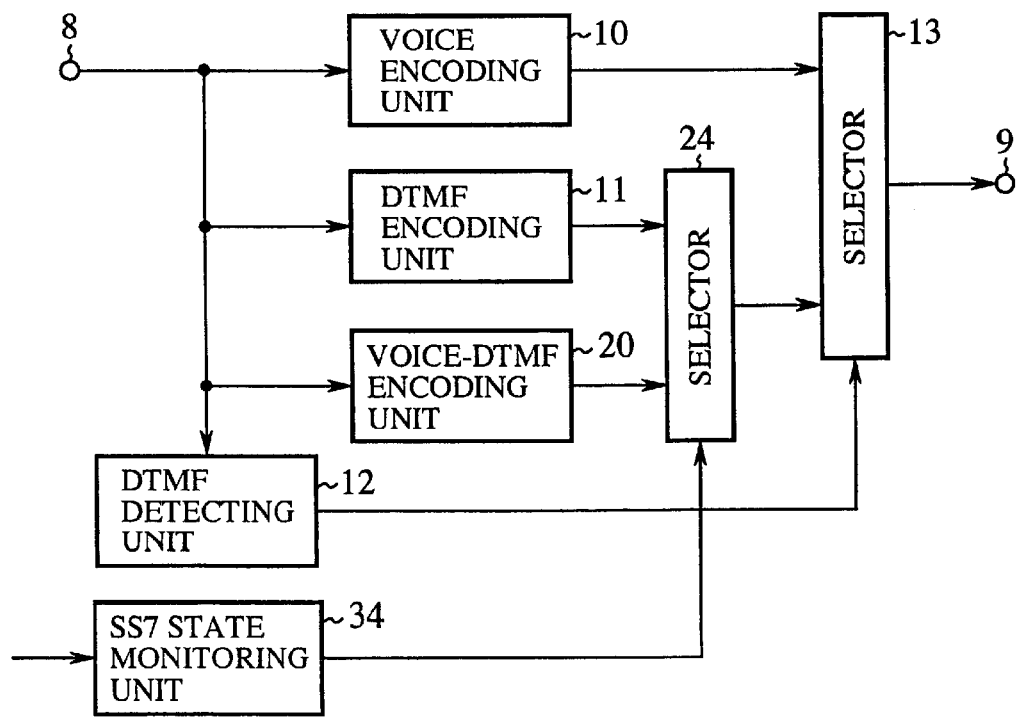
FIG. 6 is a block diagram showing a voice transmitter according to a sixth embodiment of the present invention.

FIG. 6 is a block diagram showing a voice transmitter according to a sixth embodiment of the present invention.

Referring to FIG. 6, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal; and 12 denotes a DTMF detecting unit for detecting and judging whether or not an inputted signal is a DTMF signal. Reference numeral 34 denotes an SS7 state monitoring unit (SS7 state monitoring control means) for monitoring SS7 signaling information, which is a common line signaling, and for outputting a control signal for selecting and controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the SS7 state monitoring unit 34, and for outputting the selected output; and 13 denotes a selector for selecting an output of the voice encoding unit 10 or that of the selector 24 in response to an instruction from the DTMF detecting unit 12, and for outputting the selected output.

Next, the operation of the sixth embodiment will be described.

When a signal is inputted from the input terminal 8, an audio signal is voice-encoded in the voice encoding unit 10. In addition, in the DTMF encoding unit 11, an audio signal of DTMF is decoded into a numerical value of the DTMF. In the voice-DTMF encoding unit 20, an audio signal of DTMF is voice-encoded as an audio signal. The SS7 state monitoring unit 34 monitors the SS7 signaling information, and if the current state is judged to be in the course of a call connection sequence in which a telephone conversation is not yet started, controls the selector 24 so that an output of the DTMF encoding unit 11 is selected. If the SS7 state monitoring unit 34 judged the current state to be busy in which the call connection has already been finished, then the SS7 state monitoring unit 34 controls the selector 24 so that an output of the voice-DTMF encoding unit 20 is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the sixth embodiment, the SS7 state monitoring unit 34 is used as the call connection state monitoring unit 31 of the third embodiment. Selectively controlling the voice-DTMF encoding unit 20 during a telephone conversation achieves a high-quality transmission. This does not give an unpleasant feeling to a caller, even when a DTMF signal is detected false, as a DTMF signal is transmitted in the same manner as an audio signal, and reliably transmits the DTMF signal, as the DTMF encoding unit 11 is selected to decode the DTMF signal, when a DTMF is actually transmitted during the call connection sequence.

Seventh Embodiment

Figure 7:
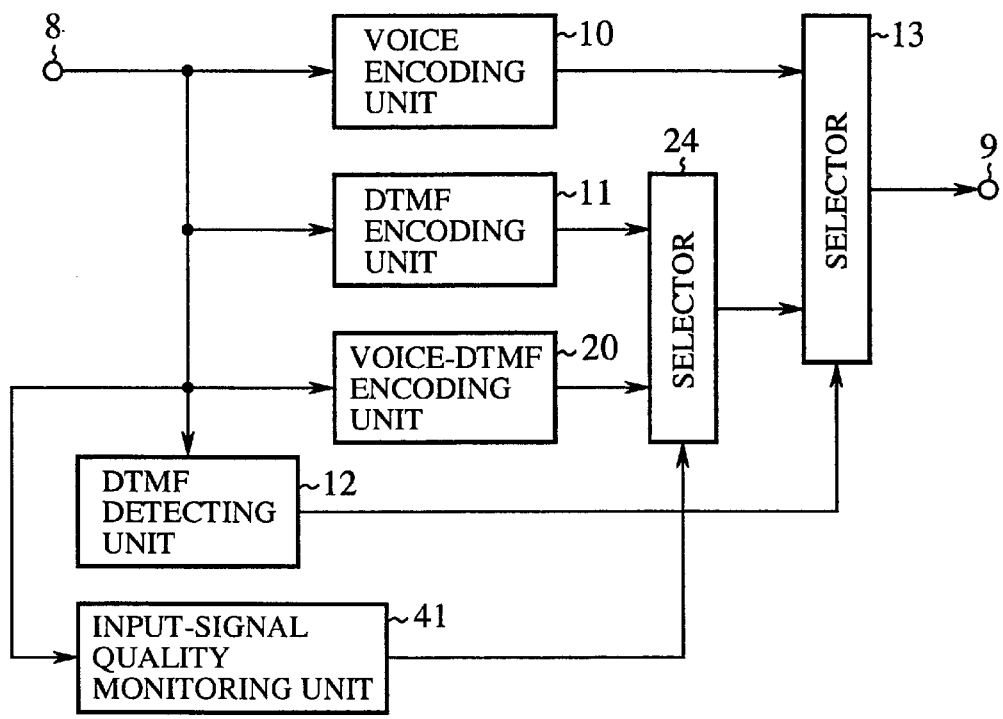
FIG. 7 is a block diagram showing a voice transmitter according to a seventh embodiment of the present invention.

FIG. 7 is a block diagram showing a voice transmitter according to a seventh embodiment of the present invention.

Referring to FIG. 7, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal; and 12 denotes a DTMF detecting unit for detecting and judging whether or not an input signal is a DTMF signal. Reference numeral 41 denotes an input-signal quality monitoring unit (input-signal quality monitoring control means) for monitoring quality of an inputted audio signal and a DTMF signal, and for outputting a control signal for selectively controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the input-signal quality monitoring unit 41, and for outputting the selected output; and 13 denotes a selector for selecting an output of the voice encoding unit 10 or that of the selector 24 in response to an instruction from the DTMF detecting unit 12, and for outputting the selected output.

Next, the operation of the seventh embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The input-signal quality monitoring unit 41 monitors quality of inputted an audio signal and a DTMF signal, if quality is better than a certain threshold value, judges that the DTMF signal is seldom detected false and controls the selector 24 so that an output of the DTMF encoding unit 11 is selected. If quality is more poor than the certain threshold value, the input-signal quality monitoring unit 41 judges that the DTMF signal is not seldom detected false, and controls the selector 24 so that an output of the voice-DTMF encoding unit 20 is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the seventh embodiment, the input-signal quality monitoring unit 41 is used as the DTMF transmission control unit 23 of the first embodiment. If there is a fair possibility that a DTMF signal will be detected false, selectively controlling the voice-DTMF encoding unit 20, achieves a high-quality transmission system. This does not give an unpleasant feeling to a caller, even when a DTMF signal is detected false, as the DTMF signal is transmitted in the same manner as an audio aignal, and reliably transmits the DTMF signal.

Eighth Embodiment

Figure 8:
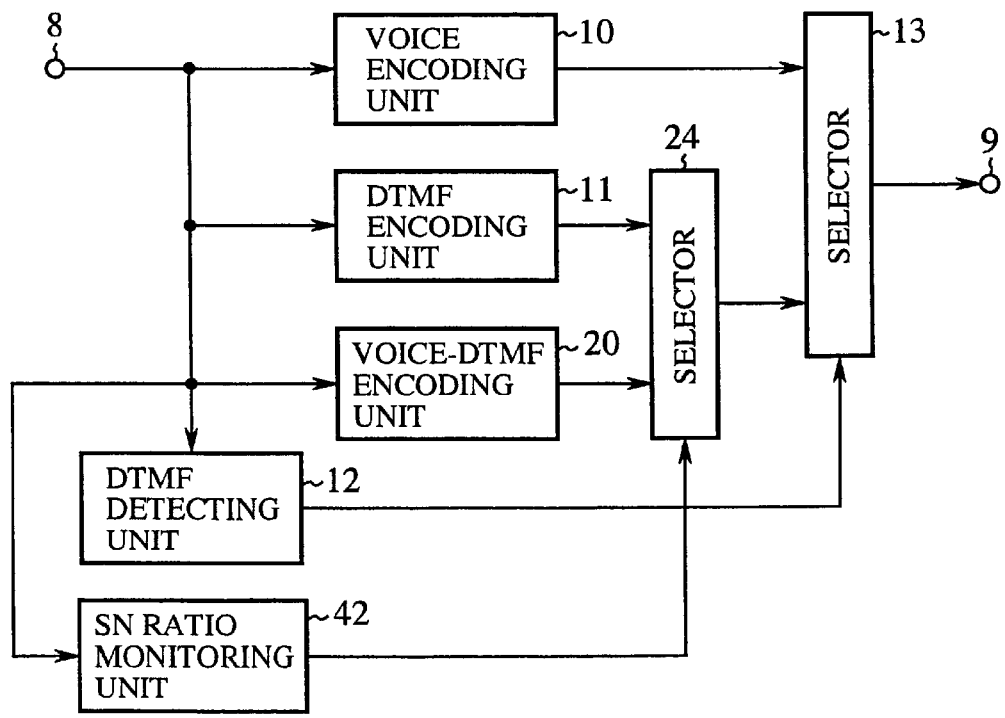
FIG. 8 is a block diagram showing a voice transmitter according to an eighth embodiment of the present invention.

FIG. 8 is a block diagram showing a voice transmitter according to an eighth embodiment of the present invention.

Referring to FIG. 8, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal; and 12 denotes a DTMF detecting unit for detecting and judging whether or not an input signal is a DTMF signal. Reference numeral 42 denotes an SN ratio monitoring unit (SN ratio monitoring control means) for monitoring SN ratios of an inputted audio signal and a DTMF signal, and for, depending on the SN ratios, selectively controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the SN ratio monitoring unit 42, and for outputting the selected output; and 13 denotes a selector for selecting an output of the voice encoding unit 10 or that of the selector 24 in response to an instruction from the DTMF detecting unit 12, and for outputting the selected output.

Next, the operation of the eighth embodiment will be described.

When a signal is inputted from the input terminal 8, an audio signal is voice-encoded in the voice encoding unit 10.

In addition, in the DTMF encoding unit 11, a DTMF audio signal is decoded into a DTMF numerical value. In the voice-DTMF encoding unit 20, the DTMF audio signal is voice-encoded as an audio signal. The SN ratio monitoring unit 42 monitors SN ratios of an inputted audio signal and a DTMF signal, if the SN ratios are greater than a certain threshold value, judges that the DTMF signal is seldom detected false and controls the selector 24 so that an output of a DTMF encoding unit 11 is selected. If the SN ratios are smaller than the certain threshold value, the SN ratio monitoring unit 42 judges that the DTMF signal is not seldom detected false, and controls the selector 24 so that an output of the voice-DTMF encoding unit 20 is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the eighth embodiment, the SN ratio monitoring unit 42 is used as the input-signal quality monitoring unit 41 of the seventh embodiment. If there is a fair possibility that a DTMF signal will be detected false, selectively controlling the voice-DTMF encoding unit 20, achieves a high-quality transmission sytstem. This does not give an unpleasant feeling to a caller, even when a DTMF signal is detected false, as the DTMF signal is transmitted in the same manner as an audio signal, and reliably transmits the DTMF signal.

Ninth Embodiment

Figure 9:
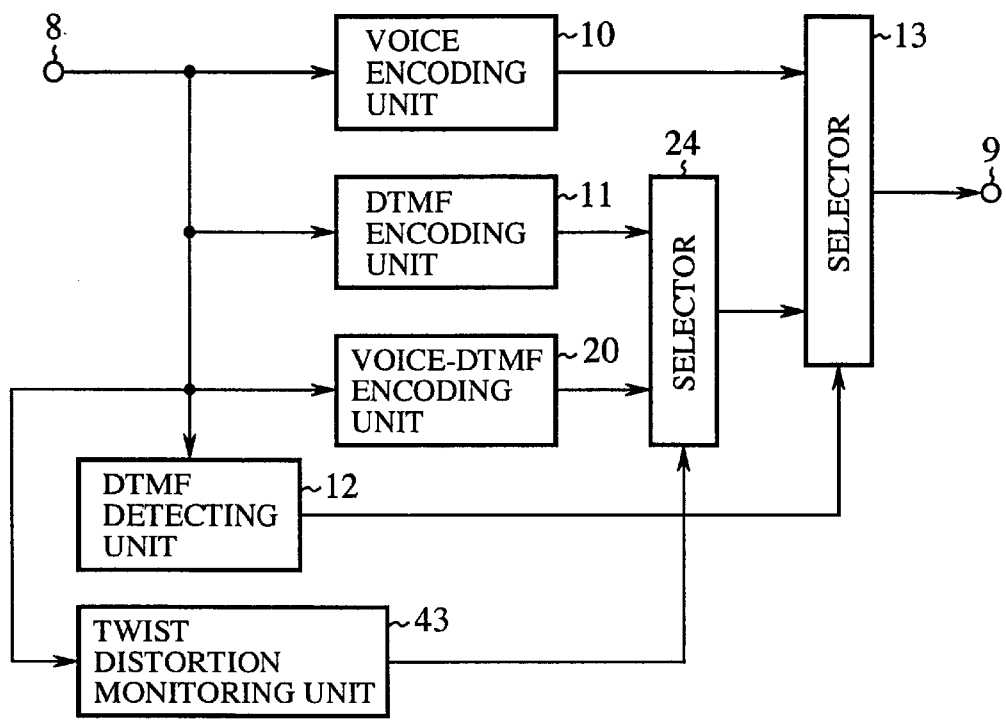
FIG. 9 is a block diagram showing a voice transmitter according to a ninth embodiment of the present invention.

FIG. 9 is a block diagram showing a voice transmitter according to a ninth embodiment of the present invention.

Referring to FIG. 9, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal; and 12 denotes a DTMF detecting unit for detecting and judging whether or not an input signal is a DTMF signal. Reference numeral 43 denotes a twist distortion monitoring unit (twist distortion monitoring control means) for monitoring twist distortion of an inputted DTMF signal, and for outputting a control signal for selecting and controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the twist distortion monitoring unit 43, and for outputting the selected output; and 13 denotes a selector for selecting an output of the voice encoding unit 10 or that of the selector 24 in response to an instruction from the DTMF detecting unit 12, and for outputting the selected output.

Next, the operation of the ninth embodiment will be described.

When a signal is inputted from the input terminal 8, an audio signal is voice-encoded in the voice encoding unit 10. In addition, in the DTMF encoding unit 11, a DTMF audio signal DTMF is decoded into a DTMF numerical value. In the voice-DTMF encoding unit 20, the DTMF audio signal is voice-encoded as an audio signal. The twist distortion monitoring unit 43 monitors twist distortion of an inputted DTMF signal, if the twist distortion is better than a certain threshold value, judges a DTMF signal is seldom detected false and controls the selector 24 so that an output of the DTMF encoding unit 11 is selected. If the twist distortion is more poor than the certain threshold value, the twist distortion monitoring unit 43 judges that the DTMF signal is not seldom detected false, and controls the selector 24 so that an output of the voice-DTMF encoding unit 20 is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the ninth embodiment, the twist distortion monitoring unit 43 is used as the input-signal quality monitoring unit 41 of the seventh embodiment. If there is a fair possibility that a DTMF signal will be detected false, selectively controlling the voice-DTMF encoding unit 20, achieves a high-quality transmission system. This does not give an unpleasant feeling to a caller, even when a DTMF signal is detected false, as the DTMF signal is transmitted in the same manner as an audio signal, and reliably transmits a DTMF signal.

Tenth Embodiment

Figure 10:
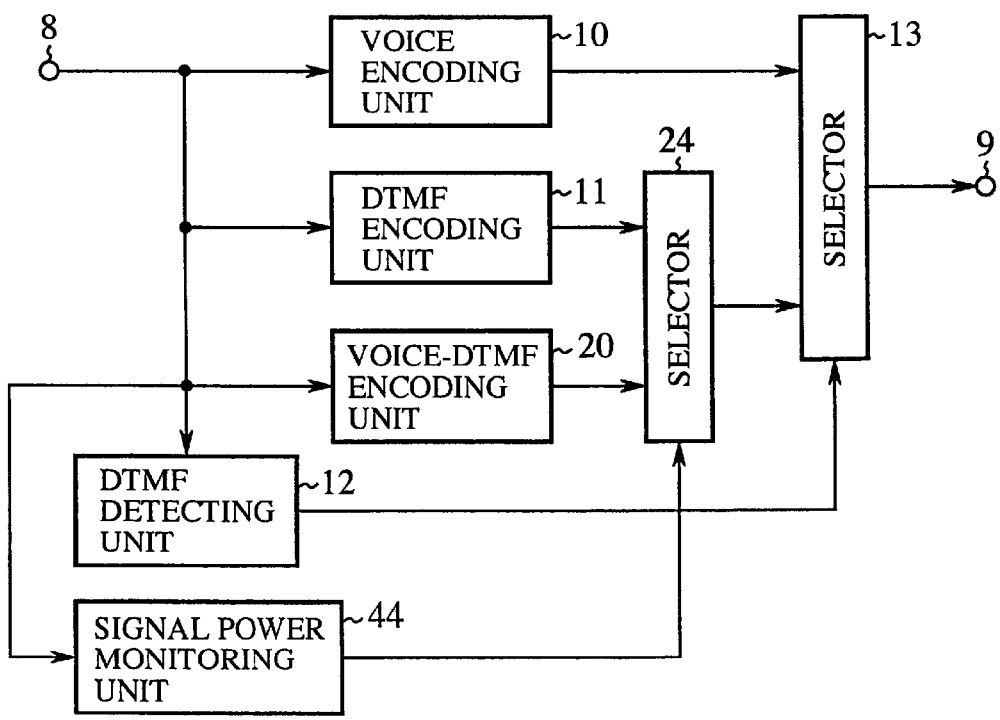
FIG. 10 is a block diagram showing a voice transmitter according to a tenth embodiment of the present invention.

FIG. 10 is a block diagram showing a voice transmitter according to a tenth embodiment of the present invention.

Referring to FIG. 10, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal d; and 12 denotes a DTMF detecting unit for detecting and judging whether or not an input signal is a DTMF signal. Reference numeral 44 denotes a signal power monitoring unit (signal power monitoring control means) for monitoring signal power of an inputted audio signal and a DTMF signal, and for outputting a control signal for selectively controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the signal power monitoring unit 44, and for outputting the selected output; and 13 denotes a selector for selecting an output of the voice encoding unit 10 or that of the selector 24 in response to an instruction from the DTMF detecting unit 12, and for outputting the selected output.

Next, the operation of the tenth embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The signal power monitoring unit 44 monitors signal power of an inputted audio signal and a DTMF signal, if the signal power is higher than a certain threshold value, judges that a DTMF signal s seldom detected false and controls the selector 24 so that an output of the DTMF encoding unit 11 is selected. If the signal power is lower than the certain threshold value, the signal power monitoring unit 44 judges that the DTMF signal is not seldom detected false and controls the selector 24 so that an output of the voice-DTMF encoding unit 20 is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the tenth embodiment, the signal power monitoring unit 44 is used as the input-signal quality monitoring unit 41 of the seventh embodiment. If there is a fair possibility that a DTMF signal will be detected false, selectively controlling the voice-DTMF encoding unit 20, achieves a high-quality transmission system. This does not give an unpleasant feeling to a caller, even when a DTMF signal is detected false, as the DTMF signal is transmitted in the same manner as an audio signal, and reliably transmits a DTMF signal.

Eleventh Embodiment

Figure 11:
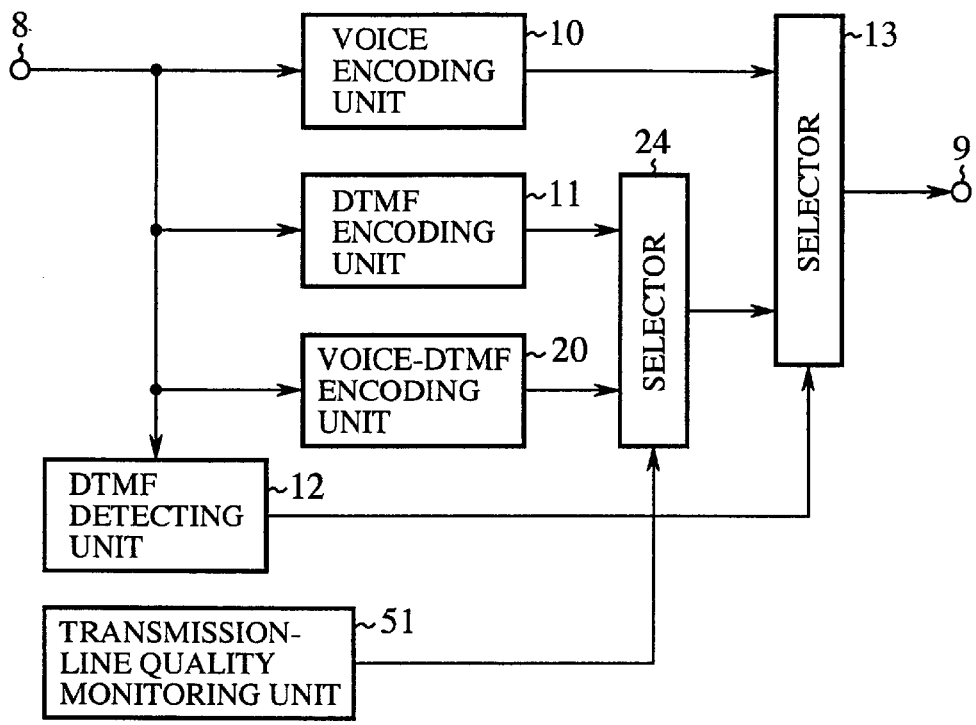
FIG. 11 is a block diagram showing a voice transmitter according to an eleventh embodiment of the present invention.

FIG. 11 is a block diagram showing a voice transmitter according to an eleventh embodiment of the present invention.

Referring to FIG. 11, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal; and 12 a DTMF detecting unit for detecting and judging whether or not an input signal is a DTMF signal. Reference numeral 51 denotes a transmission-line quality monitoring unit for monitoring transmission quality of a transmission line, and for outputting a control signal for selecting and controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the transmission-line quality monitoring unit 51, and for outputting the selected output; and 13 denotes a selector for selecting an output of the voice encoding unit 10 or that of the selector 24 in response to an instruction from the DTMF detecting unit 12, and for outputting the selected output.

Next, the operation of the eleventh embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The transmission-line quality monitoring unit 51 monitors transmission quality of a transmission line, and if the transmission line quality is more poor than a certain threshold value, controls the selector 24 so that an output of the DTMF encoding unit 11, which has higher error tolerance on the transmission line, is selected. If the transmission line quality is better than the certain threshold value, the transmission-line quality monitoring unit 51 controls the selector 24 so that an output of the voice-DTMF encoding unit 20, which does not give an unpleasant feeling to a caller, even when a DTMF signal is detected false, is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the eleventh embodiment, the transmission-line quality monitoring unit 51 is used as the DTMF transmission control unit 23 of the first embodiment. Therefore, if there is a fair possibility that a transmission error on the transmission line will be occurred, selecting the DTMF encoding unit 11 achieves high-quality transmission, which enables reliable transmission of a DTMF signal. If there is a little possibility that a transmission error on the transmission line will be occurred, selectively controlling the voice-DTMF encoding unit 20 achieves high-quality transmission. This does not give an unpleasant feeling to a caller, even when a DTMF signal is detected false, as the DTMF signal is transmitted in the same manner as an audio signal.

Twelfth Embodiment

Figure 12:
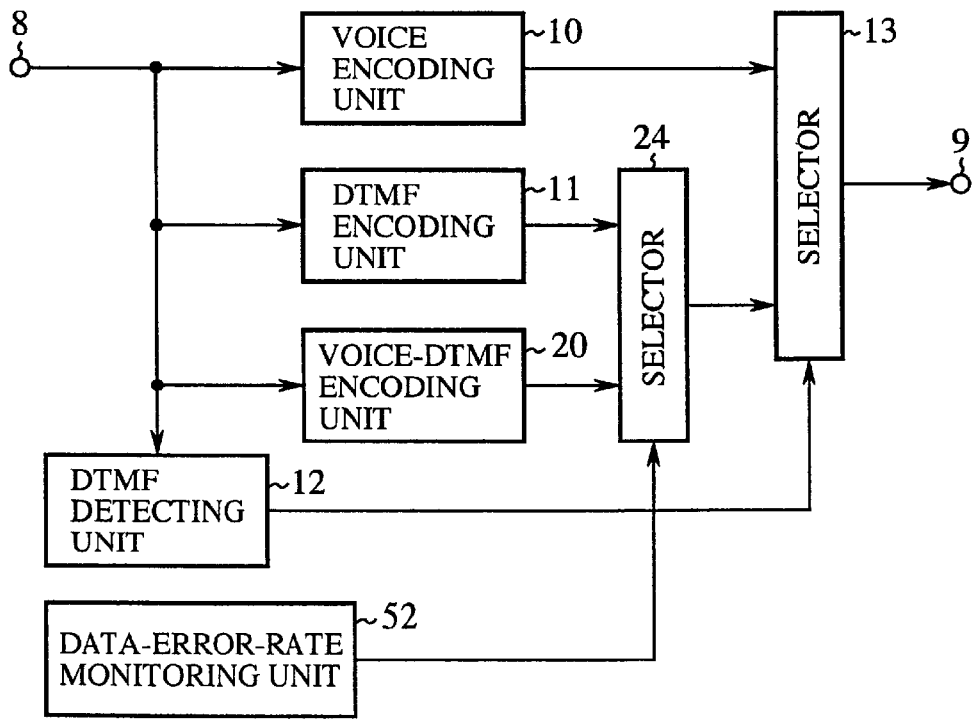
FIG. 12 is a block diagram showing a voice transmitter according to a twelfth embodiment of the present invention.

FIG. 12 is a block diagram showing a voice transmitter according to a twelfth embodiment of the present invention.

Referring to FIG. 12, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal; and 12 denotes a DTMF detecting unit for detecting and judging whether or not an input signal is a DTMF signal. Reference numeral 52 denotes a data-error-rate monitoring unit (data-error-rate monitoring control means) for monitoring a data error rate of a transmission line, and for outputting a control signal for selectively controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the data-error-rate monitoring unit 52, and for outputting the selected output; and 13 denotes a selector for selecting an output of the voice encoding unit 10 or that of the selector 24 in response to an instruction from the DTMF detecting unit 12, and for outputting the selected output.

Next, the operation of the twelfth embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The data-error-rate monitoring unit 52 monitors a data error rate of a transmission line, and if the data error rate is higher than a certain threshold value, controls the selector 24 so that an output of the DTMF encoding unit 11, which has higher error tolerance on the transmission line, is selected. If the data error rate is lower than the certain threshold value, the data-error-rate monitoring unit 52 controls the selector 24 so that an output of the voice-DTMF encoding unit 20, which does not give an unpleasant feeling to a caller, even when a DTMF signal is detected false, is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the twelfth embodiment, the data-error-rate monitoring unit 52 is used as the transmission-line quality monitoring unit 51 of the eleventh embodiment. Therefore, if there is a fair possibility that a data error on the transmission line will be occurred, selecting the DTMF encoding unit 11 achieves high-quality transmission, which enables reliable transmission of a DTMF signal. If there is a little possibility that a data error on the transmission line will be occurred, selectively controlling the voice-DTMF encoding unit 20 achieves high-quality transmission. This does not give an unpleasant feeling to a caller, even when a DTMF signal is detected false, as the DTMF signal is transmitted in the same manner as an audio signal.

Thirteenth Embodiment

Figure 13:
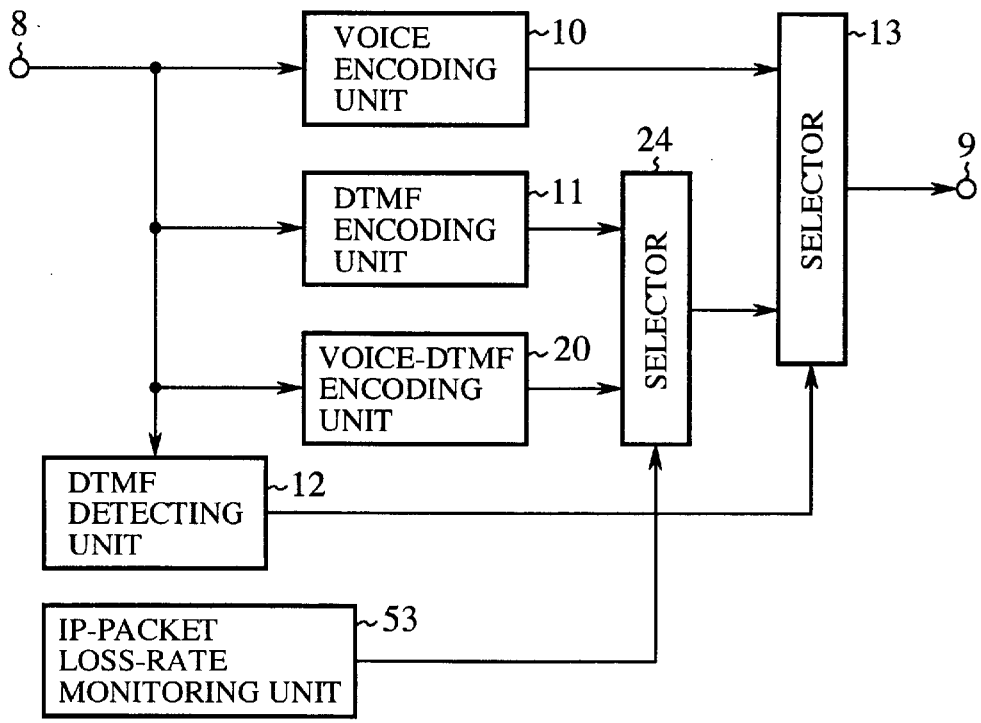
FIG. 13 is a block diagram showing a voice transmitter according to a thirteenth embodiment of the present invention.

FIG. 13 is a block diagram showing a voice transmitter according to a thirteenth embodiment of the present invention.

Referring to FIG. 13, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 is a voice-DTMF encoding unit for performing encoding of an inputted audio signal and a DTMF signal; and 12 denotes a DTMF detecting unit for detecting and judging whether or not an input signal is a DTMF signal. Reference numeral 53 denotes an IP-packet loss-rate monitoring unit (IP-packet loss-rate monitoring control means) for monitoring a loss rate of an IP packet of a transmission line, and for outputting a control signal for selectively controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the IP-packet loss-rate monitoring unit 53, and for outputting the selected output; and 13 denotes a selector for selecting an output of the voice encoding unit 10 or that of the selector 24 in response to an instruction from the DTMF detecting unit 12, and for outputting the selected output.

Next, the operation of the thirteenth embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The IP-packet loss-rate monitoring unit 53 monitors an IP packet loss rate of the transmission line, and if the IP packet loss rate is higher than a certain threshold value, controls the selector 24 so that an output of the DTMF encoding unit 11, which has higher error tolerance on the transmission line, is selected. If the IP packet loss rate is lower than the certain threshold value, the IP-packet loss-rate monitoring unit 53 controls the selector 24 so that an output of the voice-DTMF encoding unit 20, which does not give an unpleasant feeling to a caller, even when a DTMF signal is detected false, is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. In addition, if the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the thirteenth embodiment, the IP-packet loss-rate monitoring unit 53 is used as the transmission-line quality monitoring unit 51 of the eleventh embodiment. Therefore, if there is a fair possibility that an IP packet loss on the transmission line will be occurred, selecting the DTMF encoding unit 11 achieves high-quality transmission, which enables reliable transmission of a DTMF signal. If there is a little possibility that an IP packet loss on the transmission line will be occurred, selectively controlling the voice-DTMF encoding unit 20 achieves high-quality transmission. This does not give an unpleasant feeling to a caller, even when a DTMF signal is detected false, as the DTMF signal is transmitted in the same manner as an audio signal.

Fourteenth Embodiment

Figure 14:
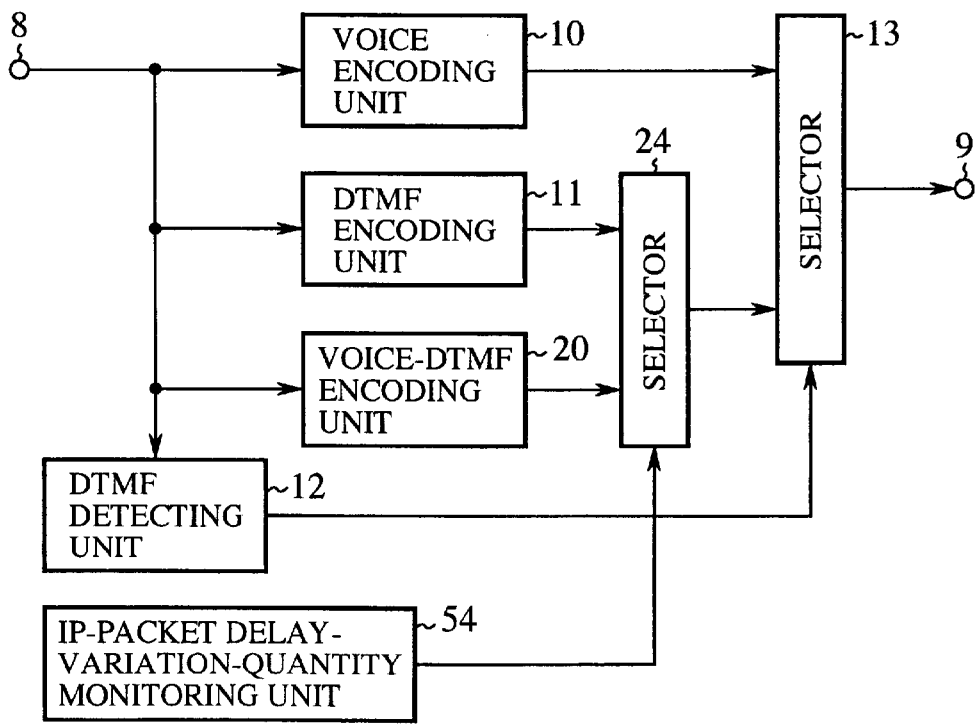
FIG. 14 is a block diagram showing a voice transmitter according to a fourteenth embodiment of the present invention.

FIG. 14 is a block diagram showing a voice transmitter according to a fourteenth embodiment of the present invention.

Referring to FIG. 14, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal; and 12 a DTMF detecting unit for detecting and judging whether or not an input signal is a DTMF signal. Reference numeral 54 denotes an IP-packet delay-variation-quantity monitoring unit (IP-packet delay-variation-quantity monitoring control means) for monitoring an IP packet incoming delay variation quantity on a transmission line, and for outputting a control signal for selectively controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the IP-packet delay-variation quantity monitoring unit 54, and for outputting the selected output; and 13 denotes a selector for selecting an output of the voice encoding unit 10 or that of the selector 24 in response to an instruction from the DTMF detecting unit 12, and for outputting the selected output.

Next, the operation of the fourteenth embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The IP-packet delay-variation-quantity monitoring unit 54 monitors an IP packet incoming delay variation quantity on a transmission line, and If the IP packet incoming delay variation quantity is larger than a certain threshold value, controls the selector 24 so that an output of the DTMF encoding unit 11, which has higher error tolerance on the transmission line, is selected. If the IP packet incoming delay variation quantity is smaller than the certain threshold value, the IP-packet delay-variation-quantity monitoring unit 54 controls the selector 24 so that an output of the voice-DTMF encoding unit 20, which does not give an unpleasant feeling to a caller, even when a DTMF signal is detected false, is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the fourteenth embodiment, the IP-packet delay-variation-quantity monitoring unit 54 is used as the transmission-line quality monitoring unit 51 of the eleventh embodiment. Therefore, if there is a fair possibility that a packet will be counted as being loss, depending on the IP packet incoming delay variation quantity on the transmission line, selecting the DTMF encoding unit 11 achieves high-quality transmission, which enables reliable transmission of a DTMF signal. If there is a little possibility that a packet will be counted as being loss, depending on the IP packet incoming delay variation quantity on the transmission line, selectively controlling the voice-DTMF encoding unit 20 achieves high-quality transmission. This does not give an unpleasant feeling to a caller, even when a DTMF signal is detected false, as the DTMF signal is transmitted in the same manner as an audio signal.

Fifteenth Embodiment

Figure 15:
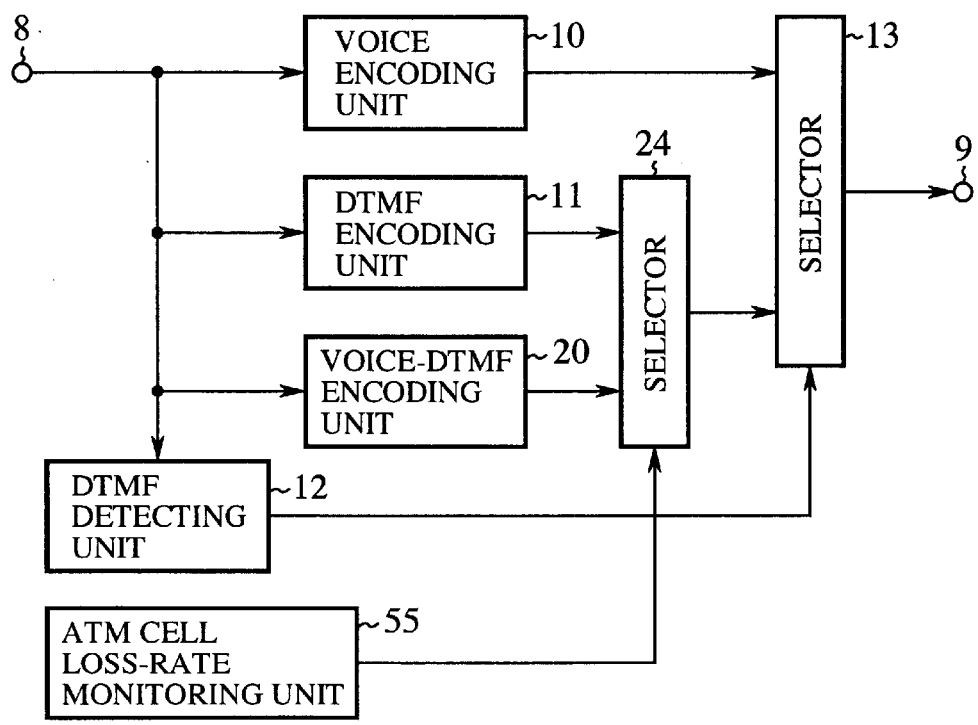
FIG. 15 is a block diagram showing a voice transmitter according to a fifteenth embodiment of the present invention.

FIG. 15 is a block diagram showing a voice transmitter according to a fifteenth embodiment of the present invention.

Referring to FIG. 15, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal; and 12 denotes a DTMF detecting unit for detecting and judging whether or not an input signal is a DTMF signal. Reference numeral 55 denotes an ATM cell loss-rate monitoring unit (ATM cell loss-rate monitoring control means) for monitoring a loss rate of an ATM cell of a transmission line, and for outputting a control signal for selectively controlling either the DTMF encoding unit 11 or the voice-DTMF encoding unit 20 for a DTMF signal transmission. Reference numeral 24 is a selector for selecting an output of the DTMF encoding unit 11 or that of the voice-DTMF encoding unit 20 in response to an instruction from the ATM cell loss-rate monitoring unit 55, and for outputting the selected output; and 13 denotes a selector for selecting an output of the voice encoding unit 10 or that of the selector 24 in response to an instruction from the DTMF detecting unit 12, and for outputting the selected output.

Next, the operation of the fifteenth embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The ATM cell loss-rate monitoring unit 55 monitors an ATM cell loss rate of the transmission line, and if the ATM cell loss rate is higher than a certain threshold value, controls the selector 24 so that an output of the DTMF encoding unit 11, which has higher error tolerance on the transmission line, is selected. If the ATM cell loss rate is lower than the certain threshold value, the ATM cell loss-rate monitoring unit 55 controls the selector 24 so that an output of the voice-DTMF encoding unit 20, which does not give an unpleasant feeling to a caller, even when a DTMF signal is detected false, is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the fifteenth embodiment, the ATM cell loss-rate monitoring unit 55 is used as the transmission-line quality monitoring unit 51 of the eleventh embodiment. Therefore, if there is a fair possibility that an ATM cell loss on the transmission line will be occurred, selecting the DTMF encoding unit 11 achieves high-quality transmission, which enables reliable transmission of a DTMF signal. If there is a little possibility that an ATM cell loss will be occurred, selecting and controlling the voice-DTMF encoding unit 20 achieves high-quality transmission. This does not give an unpleasant feeling to a caller, even when a DTMF signal is detected false, as the DTMF signal is transmitted in the same manner as an audio signal.

Sixteenth Embodiment

Figure 16:
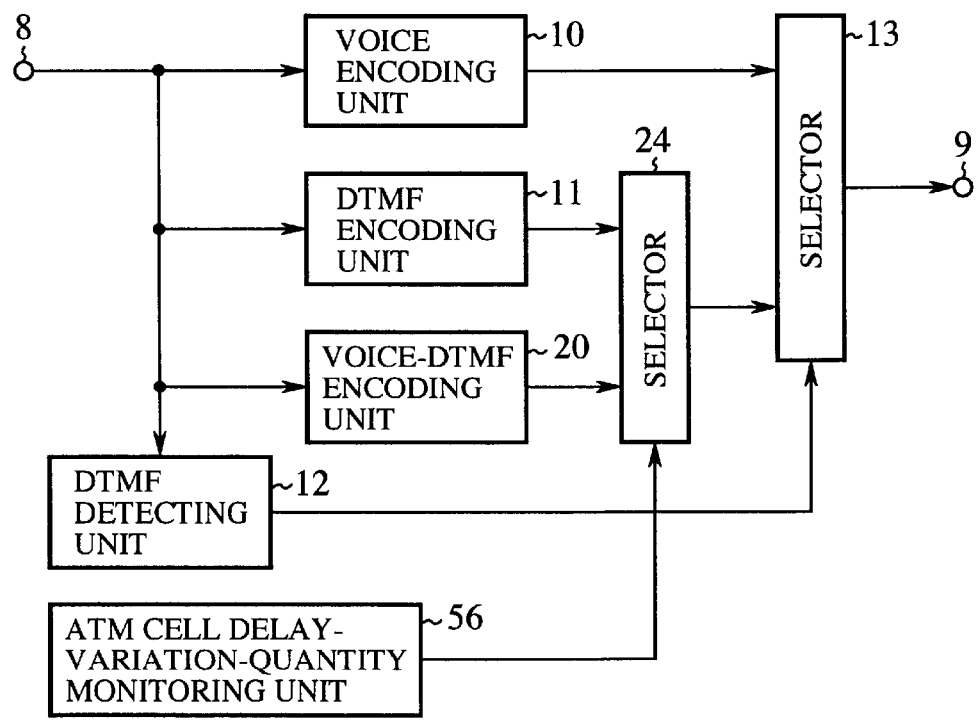
FIG. 16 is a block diagram showing a voice transmitter according to a sixteenth embodiment of the present invention.

FIG. 16 is a block diagram showing a voice transmitter according to a sixteenth embodiment of the present invention.

Referring to FIG. 16, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal; and 12 denotes a DTMF detecting unit for detecting and judging whether or not an input signal is a DTMF signal. Reference numeral 56 denotes an ATM cell delay-variation-quantity monitoring unit (ATM cell delay-variation-quantity monitoring control means) for monitoring an ATM cell incoming delay variation quantity of a transmission line, and for outputting a control signal for selectively controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the ATM cell delay-variation-quantity monitoring unit 56, and for outputting the selected output; and 13 denotes a selector for selecting an output of the voice encoding unit 10 or that of the selector 24 in response to an instruction from the DTMF detecting unit 12, and for outputting the selected output.

Next, the operation of the sixteenth embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The ATM cell delay-variation-quantity monitoring unit 56 monitors an ATM cell incoming delay variation quantity of the transmission line, and if the ATM cell incoming delay variation quantity is larger than a certain threshold value, controls the selector 24 so that an output of the DTMF encoding unit 11, which has higher error tolerance on the transmission line, is selected. If the ATM cell incoming delay variation quantity is smaller than the certain threshold value, the ATM cell delay-variation-quantity monitoring unit 56 controls the selector 24 so that an output of the voice-DTMF encoding unit 20, which does not give an unpleasant feeling to a caller, even when a DTMF signal is detected false, is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the sixteenth embodiment, the ATM cell delay-variation-quantity monitoring unit 56 is used as the transmission-line quality monitoring unit 51 of the eleventh embodiment. Therefore, if there is a fair possibility that a packet will be counted as being loss, depending on the ATM cell incoming delay variation quantity on the transmission line, selecting the DTMF encoding unit 11 achieves high-quality transmission, which enables reliable transmission of a DTMF signal. If there is a little possibility that a packet will be counted as being loss, depending on the ATM cell incoming delay variation quantity on the transmission line, selectively controlling the voice-DTMF encoding unit 20 achieves high-quality transmission. This does not give an unpleasant feeling to a caller, even when a DTMF signal is detected false, as the DTMF signal is transmitted in the same manner as an audio signal.

Seventeenth Embodiment

Figure 17:
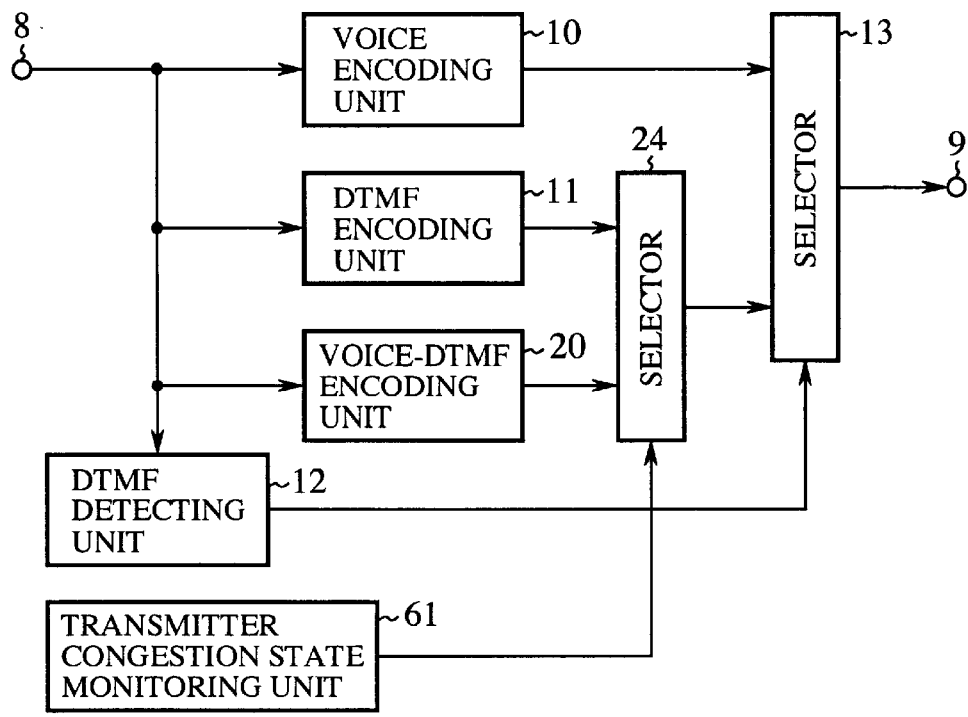
FIG. 17 is a block diagram showing a voice transmitter according to a seventeenth embodiment of the present invention.

FIG. 17 is a block diagram showing a voice transmitter according to a seventeenth embodiment of the present invention.

Referring to FIG. 17, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal; and 12 denotes a DTMF detecting unit for detecting and judging whether or not an input signal is a DTMF signal. Reference numeral 61 denotes a transmitter congestion state monitoring unit (a transmitter congestion state monitoring control means) for monitoring a congestion state in the transmitter, and for outputting a control signal for selectively controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the transmitter congestion state monitoring unit 61, and for outputting the selected output; and 13 denotes a selector for selecting an output of the voice encoding unit 10 or that of the selector 24 in response to an instruction from the DTMF detecting unit 12, and for outputting the selected output.

Next, the operation of the seventeenth embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The transmission congestion state monitoring unit 61 monitors a congestion state in the transmitter, if the transmission congestion is higher than a certain threshold value, judges that data will be often discarded without outputting it to the transmission line, and for controlling the selector 24 so that an output of the DTMF encoding unit 11, which has higher tolerance to degradation in transmission quality, is selected. If the transmission congestion is lower than the certain threshold value, the transmission congestion state monitoring unit 61 controls the selector 24 so that an output of the voice-DTMF encoding unit 20, which does not give an unpleasant feeling to a caller, even when a DTMF signal is detected false, is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the seventeenth embodiment, the transmission congestion state monitoring unit 61 is used as the DTMF transmission control unit 23 of the first embodiment. Therefore, if there is a fair possibility that the transmission quality will be degraded, due to the congestion in the transmitter, selecting the DTMF encoding unit 11 achieves high-quality transmission, which enables reliable transmission of a DTMF signal. If there is a little possibility that the transmission quality will be degraded, due to the congestion in the transmitter, selectively controlling the voice-DTMF encoding unit 20 achieves high-quality transmission. This does not give an unpleasant feeling to a caller, even when a DTMF signal is detected false, as the DTMF signal is transmitted in the same manner as an audio signal.

Eighteenth Embodiment

Figure 18:
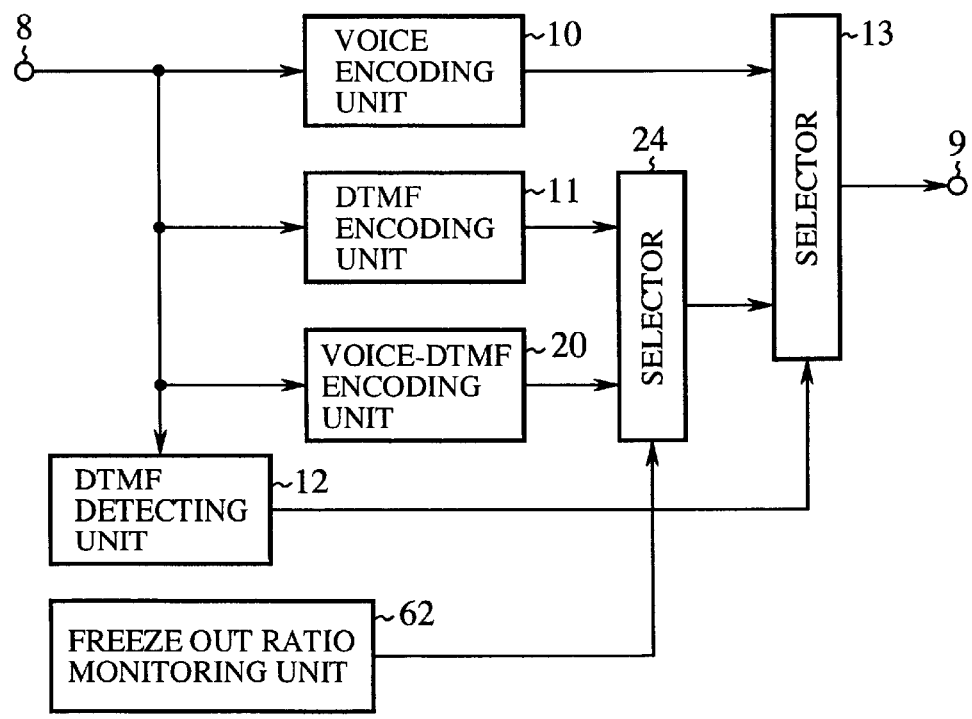
FIG. 18 is a block diagram showing a voice transmitter according to a eighteenth embodiment of the present invention.

FIG. 18 is a block diagram showing a voice transmitter according to an eighteenth embodiment of the present invention.

Referring to FIG. 18, reference numeral 8 denotes an input terminal of the voice transmitter; 9 an output terminal of the voice transmitter; 10 a voice encoding unit for voice-encoding an audio signal; and 11 is a DTMF encoding unit for performing encoding of a DTMF signal. Reference numeral 20 denotes a voice-DTMF encoding unit for performing encoding of an inputted audio signal and a DTMF signal; and 12 denotes a DTMF detecting unit for detecting and judging whether or not an input signal is a DTMF signal. Reference numeral 62 denotes a freeze out ratio monitoring unit (freeze out ratio monitoring control means) for, as is the case with a DCME (Digital Circuit Multiplication Equipment), monitoring a freeze out ratio, which is a ratio of audio signals to be transmitted that could not be transmitted due to congestion in the transmitter, and for outputting a control signal for selectively controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the freeze out ratio monitoring unit 62, and for outputting the selected output; and 13 denotes a selector for selecting an output of the voice encoding unit 10 or that of the selector 24 in response to an instruction from the DTMF detecting unit 12, and for outputting the selected output.

Next, the operation of the eighteenth embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The freeze out ratio monitoring unit 62 monitors a freeze out ratio, and if the freeze out ratio is higher than a certain threshold value, controls the selector 24 so that an output of the DTMF encoding unit 11, which has higher error tolerance, is selected. If the freeze out ratio is lower than the certain threshold value, the freeze out ratio monitoring unit 62 controls the selector 24 so that an output of the voice-DTMF encoding unit 20, which does not give an unpleasant feeling to a caller, even when a DTMF signal is detected false, is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As-described above, according to the eighteenth embodiment, the freeze out ratio monitoring unit 62 is used as the transmitter congestion state monitoring unit 61 of the seventeenth embodiment. Therefore, as is the case with a DCME, a freeze out ratio indicative of a congestion state in the transmitter is monitored. As a result, if there is a fair possibility that the transmission quality will be degraded, selecting the DTMF encoding unit 11 achieves high-quality transmission, which enables reliable transmission of a DTMF signal. If there is a little possibility that the transmission quality will be degraded, selectively controlling the voice-DTMF encoding unit 20 achieves high-quality transmission. This does not give an unpleasant feeling to a caller, even when a DTMF signal is detected false, as the DTMF signal is transmitted in the same manner as an audio signal.

Nineteenth Embodiment

Figure 19:
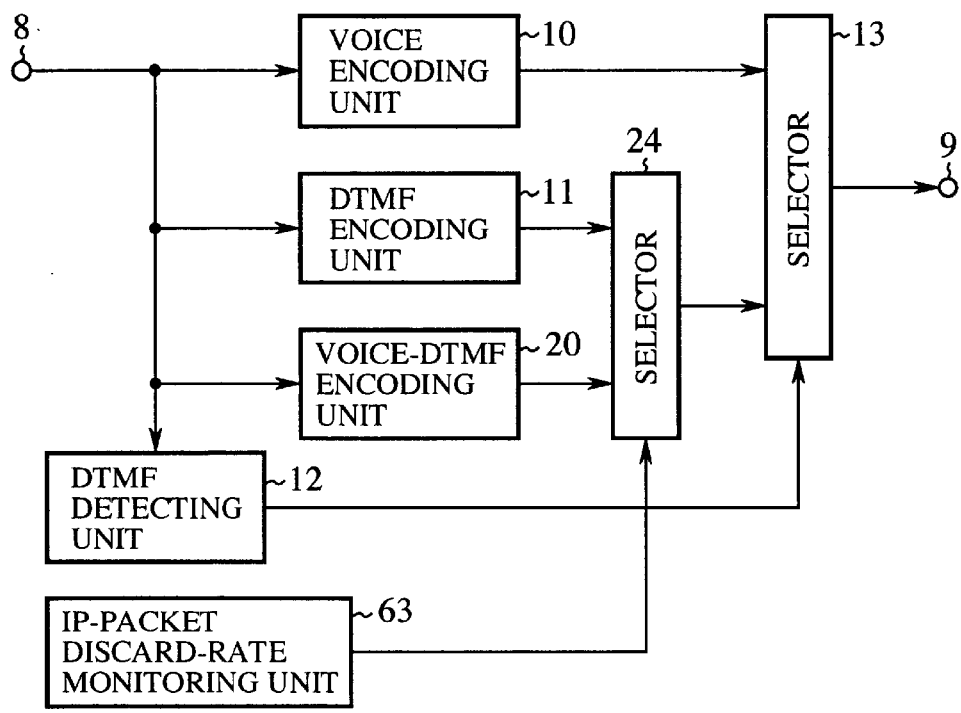
FIG. 19 is a block diagram showing a voice transmitter according to a nineteenth embodiment of the present invention.

FIG. 19 is a block diagram showing a voice transmitter according to a nineteenth embodiment of the present invention.

Referring to FIG. 19, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal; and 12 denotes a DTMF detecting unit for detecting and judging whether or not an input signal is a DTMF signal. Reference numeral 63 denotes an IP-packet discard-rate monitoring unit (IP-packet discard-rate monitoring control means) for monitoring an IP packet discard rate, which is a ratio of IP packets to be transmitted that could not be transmitted due to congestion in the transmitter, and for outputting a control signal for selectively controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the IP-packet discard-rate monitoring unit 63, and for outputting the selected output; and 13 denotes a selector for selecting an output of the voice encoding unit 10 or that of the selector 24 in response to an instruction from the DTMF detecting unit 12, and for outputting the selected output.

Next, the operation of the nineteenth embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The IP-packet discard-rate monitoring unit 63 monitors the IP packet discard rate, and if the IP packet discard rate is higher than a certain threshold value, controls the selector 24 so that an output of the DTMF encoding unit 11, which has higher error tolerance, is selected. If the IP packet discard rate is lower than the certain threshold value, the IP-packet discard-rate monitoring unit 63 controls the selector 24 so that an output of the voice-DTMF encoding unit 20, which does not give an unpleasant feeling to a caller, even when a DTMF signal is detected false, is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the nineteenth embodiment, the IP-packet-discard-rate monitoring unit 62 is used as the transmission congestion state monitoring unit 61 of the seventeenth embodiment. Therefore, if there is a fair possibility that the transmission quality will be degraded, depending on monitored IP packet discard rate indicative of a congestion in the transmitter, selecting the DTMF encoding unit 11 achieves a high-quality transmission system, which enables reliable transmission of a DTMF signal. If there is a little possibility that the transmission quality will be degraded, selectively controlling the voice-DTMF encoding unit 20 achieves high-quality transmission. This does not give an unpleasant feeling to a caller, even when a DTMF signal is detected false, as the DTMF signal is transmitted in the same manner as an audio signal.

Twentieth Embodiment

Figure 20:
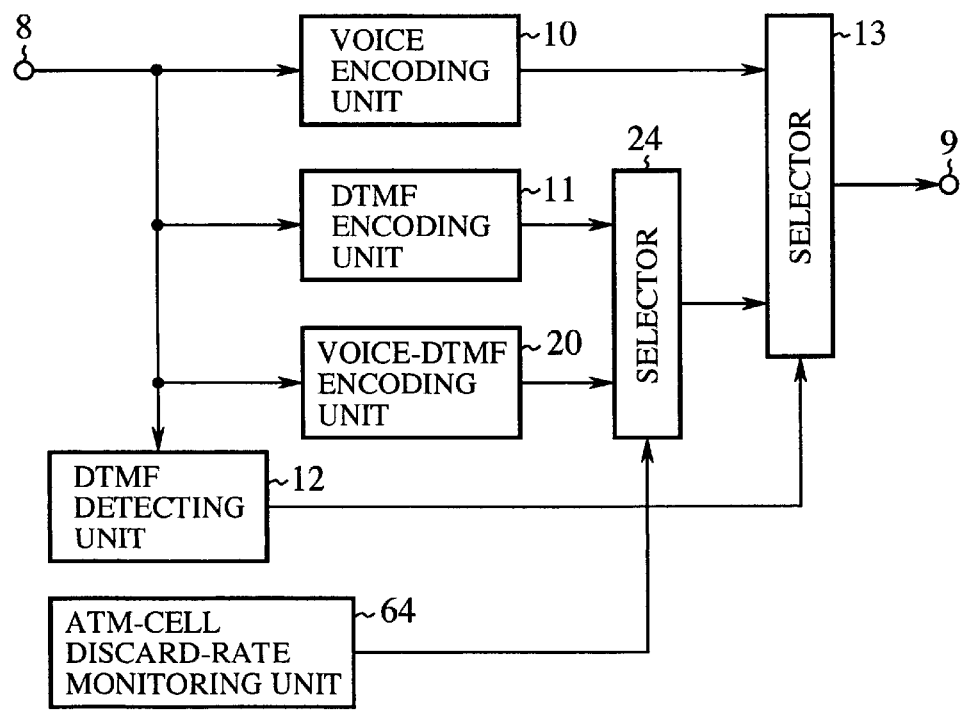
FIG. 20 is a block diagram showing a voice transmitter according to a twentieth embodiment of the present invention.

FIG. 20 is a block diagram showing a voice transmitter according to a twentieth embodiment of the present invention.

Referring to FIG. 20, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 20 denotes a voice-DTMF encoding unit for performing encoding of an inputted audio signal and a DTMF signal; and 12 denotes a DTMF detecting unit for detecting and judging whether or not an input signal is a DTMF signal. Reference numeral 64 denotes an ATM-cell discard-rate monitoring unit (ATM-cell discard-rate monitoring control means) for monitoring an ATM cell discard rate, which is a ratio of ATM cells to be transmitted that could not be transmitted due to congestion in the transmitter, and for selectively controlling either the DTMF encoding unit 11 or the voice-DTMF encoding unit 20 for a DTMF signal transmission. Reference numeral 24 denotes a selector for selecting an output of the DTMF encoding unit 11 or that of the voice-DTMF encoding unit 20 in response to an instruction from the ATM-cell discard-rate monitoring unit 64, and for outputting the selected output; and 13 denotes a selector for selecting an output of the voice encoding unit 10 or that of the selector 24 in response to an instruction from the DTMF detecting unit 12, and for outputting the selected output.

Next, the operation of the twentieth embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. In the voice-DTMF encoding unit 20, the DTMF audio signal is voice-encoded as an audio signal. The ATM-cell discard-rate monitoring unit 64 monitors an ATM cell discard rate, and if the ATM cell discard rate is higher than a certain threshold value, controls the selector 24 so that an output of the DTMF encoding unit 11, which has heigher error tolerance, is selected. If the ATM cell discard rate is lower than the certain threshold value, the ATM-cell discard-rate monitoring unit 64 controls the selector 24 so that an output of the voice-DTMF encoding unit 20, which does not give an unpleasant feeling to a caller, even when a DTMF signal is detected false, is selected. On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the output terminal 9 on the transmission line side. If the DTMF detecting unit 12 judged the input signal to be a DTMF signal, the selector 13 selects an output of the selector 24. That is to say, the DTMF signal encoded in the DTMF encoding unit 11, or the DTMF signal voice-encoded in the voice-DTMF encoding unit 20, is output to the output terminal 9 on the transmission line side.

As described above, according to the twentieth embodiment, the ATM-cell discard-rate monitoring unit 64 is used as the transmitter congestion state monitoring unit 61 of the seventeenth embodiment. Therefore, if there is a fair possibility that transmission quality will be degraded, depending on the monitored ATM cell discard rate indicative of a congestion state in the transmitter, selecting the DTMF encoding unit 11 achieves high-quality transmission, which enables reliable transmission of a DTMF signal. If there is a little possibility that transmission quality will be degraded, selectively controlling the voice-DTMF encoding unit 20 achieves high-quality transmission. This does not give an unpleasant feeling to a caller, even when a DTMF signal is detected false, as the DTMF signal is transmitted in the same manner as an audio signal.

Twenty-first Embodiment

Figure 21:
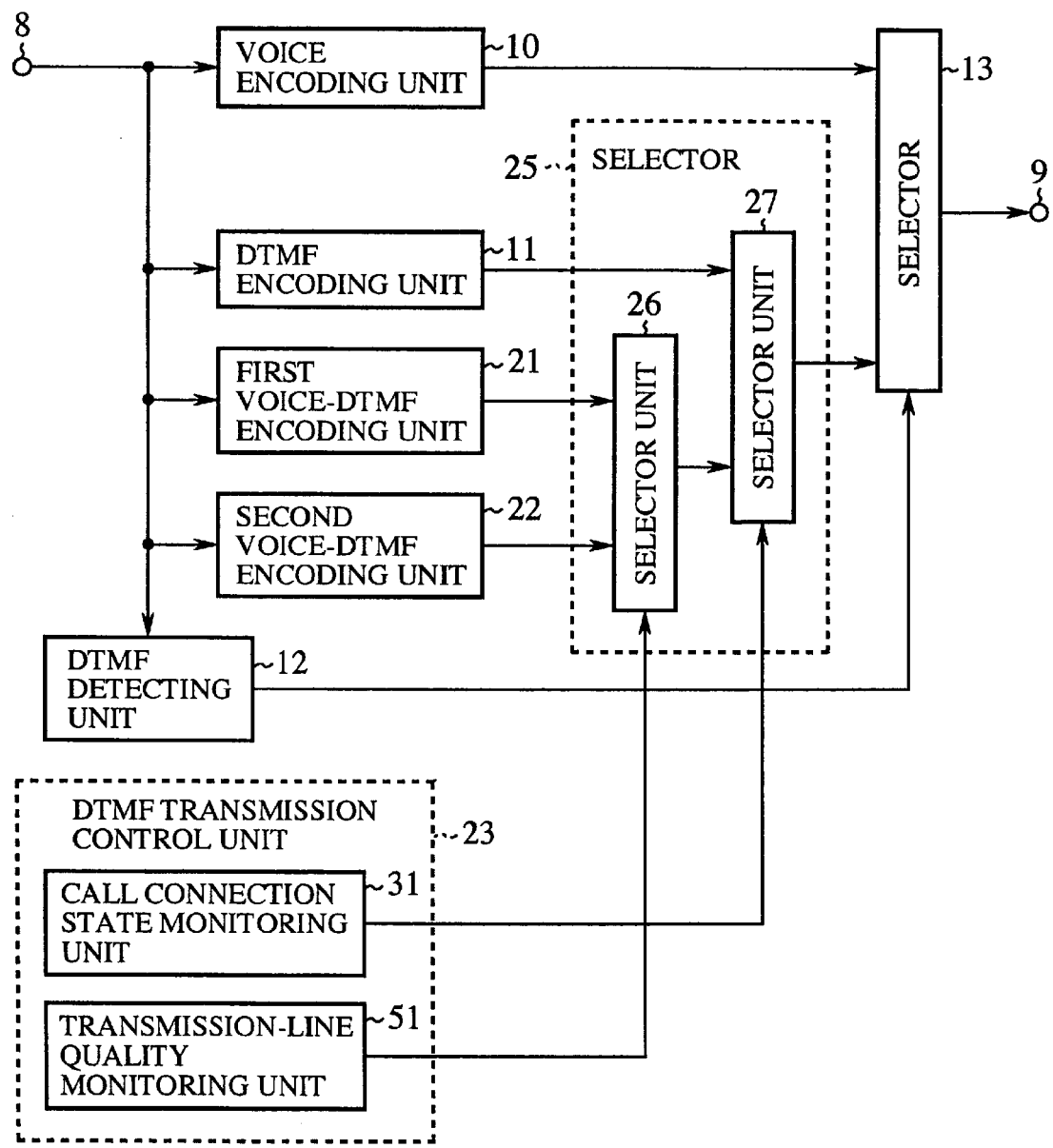
FIG. 21 is a block diagram showing a voice transmitter according to a twenty-first embodiment of the present invention.

FIG. 21 is a block diagram showing a voice transmitter according to a twenty-first embodiment of the present invention.

Referring to FIG. 21, reference numeral 8 denotes an input terminal of the voice transmitter; 9 an output terminal of the voice transmitter; 10 a voice encoding unit for voice-encoding an audio signal (voice encoding means); and 11 a DTMF encoding unit (DTMF encoding means) for performing encoding of a DTMF signal. Reference numeral 21 denotes a first voice-DTMF encoding unit (first voice-DTMF encoding means) for performing encoding of an audio signal and a DTMF signal. Reference numeral 22 denotes a second voice-DTMF encoding unit (second voice-DTMF encoding means) for performing encoding of an audio signal and a DTMF signal. Reference numeral 12 denotes a DTMF detecting unit for detecting and judging whether or not an input signal is a DTMF signal. Reference numeral 23 denotes an equivalence of the DTMF transmission control unit shown in the second embodiment, and comprises a call connection state monitoring unit 31 and a transmission-line quality monitoring unit 51. In this connection, the transmission-line quality monitoring unit 51 monitors transmission quality of a transmission line, and outputs a control signal for selectively controlling either the first voice-DTMF encoding unit 21 or the second voice-DTMF encoding unit 22 as a voice-DTMF encoding unit. On the other hand, the call connection state monitoring unit 31 monitors a call connection state, and outputs a control signal for selectively controlling the DTMF encoding unit 11, or one of the first DTMF encoding unit 21 and the second voice-DTMF encoding unit 22, which is selected by the transmission-line quality monitoring unit 51, for a DTMF signal transmission. Reference numeral 25 denotes an equivalence of the selector shown in the second embodiment, and comprises the selector units 26, 27. The selector unit 26 executes a first step of selecting an operation of the selector 25, which selects an output of the first voice-DTMF encoding unit 21 or that of the second voice-DTMF encoding unit 22 in response to an instruction from transmission quality monitoring unit 51. The selector unit 27 executes a first step, which selects an output of the DTMF encoding unit 11 or that of the selector unit 26 in response to an instruction from the call connection state monitoring unit 31 to output the selected output. Reference numeral 13 is a selector for selecting an output of the voice encoding unit 10 or the selected output of the selector unit 27 in response to an instruction from the DTMF detecting unit 12.

Next, the operation of the twenty-first embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. Moreover, in the first voice-DTMF encoding unit 21 and the second voice-DTMF encoding unit 22, the DTMF audio signal is voice-encoded as an audio signal. Here, assumed that the second voice-DTMF encoding unit 22 is an encoding unit for outputting encoded data, which encodes at a higher speed and is of better quality than those of the first voice-DTMF encoding unit 21.

The transmission-line quality monitoring unit 51 monitors transmission quality of a transmission line, if the transmission line quality is more poor than a certain threshold value, controls the selector unit 26 so that the selector unit 26 selects an output of the first voice-DTMF encoding unit 21, which outputs small quantity of data to the transmission line, and is tolerable to an error. If the transmission line quality is better than the certain threshold value, controls the selector unit 26 so that an output of the second voice-DTMF encoding unit 22 is selected (a first step). Next, the call connection state monitoring unit 31 monitors a call connection state, if the current state is in the course of call connection sequence in which a telephone conversation is not yet started, controls the selector unit 27 so that an output of the DTMF encoding unit 11 is selected. If the current state is busy in which the call connection sequence has been already finished, controls the selector unit 27 so that an output of the selector unit 26 is selectively output (a second step).

On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the transmission line side (output terminal) 9. Otherwise, the DTMF detecting unit 12 judged to be the input signal to be a DTMF signal, the selector 13 selects an output of the selector unit 27, and controls the output so that an output of the selector 25 or the selected output of the selector unit 27 is output to the transmission line side (output terminal) 9.

As described above, according to the twenty-first embodiment, the transmission-line quality monitoring unit 51 and the call connection state monitoring unit 31 are used as the DTMF transmission control unit 23 of the second embodiment. Therefore, during a telephone conversation, selectively controlling the first voice-DTMF encoding unit 21 or the second voice-DTMF encoding unit 22 achieves high-quality transmission. This does not give an unpleasant feeling to a caller, even when a DTMF signal is detected false, as the DTMF signal is transmitted in the same manner as an audio signal, and reliably transmits a DTMF signal. In addition, selectively controlling the DTMF encoding unit 11 to decode a DTMF signal, when a DTMF signal is actually transmitted during a call connection sequence. Furthermore, if there is a fair possibility that a transmission error on the transmission line will be occurred, selectively controlling the first voice-DTMF encoding unit 21, which outputs small quantity of data to the transmission line, and is tolerable to an error, permits a DTMF signal to be transmitted more reliably. If there is a little possibility that a transmission error on the transmission line will be occurred, selectively controlling the second voice-DTMF encoding unit 22 enables high-quality transmission.

Twenty-second Embodiment

Figure 22:
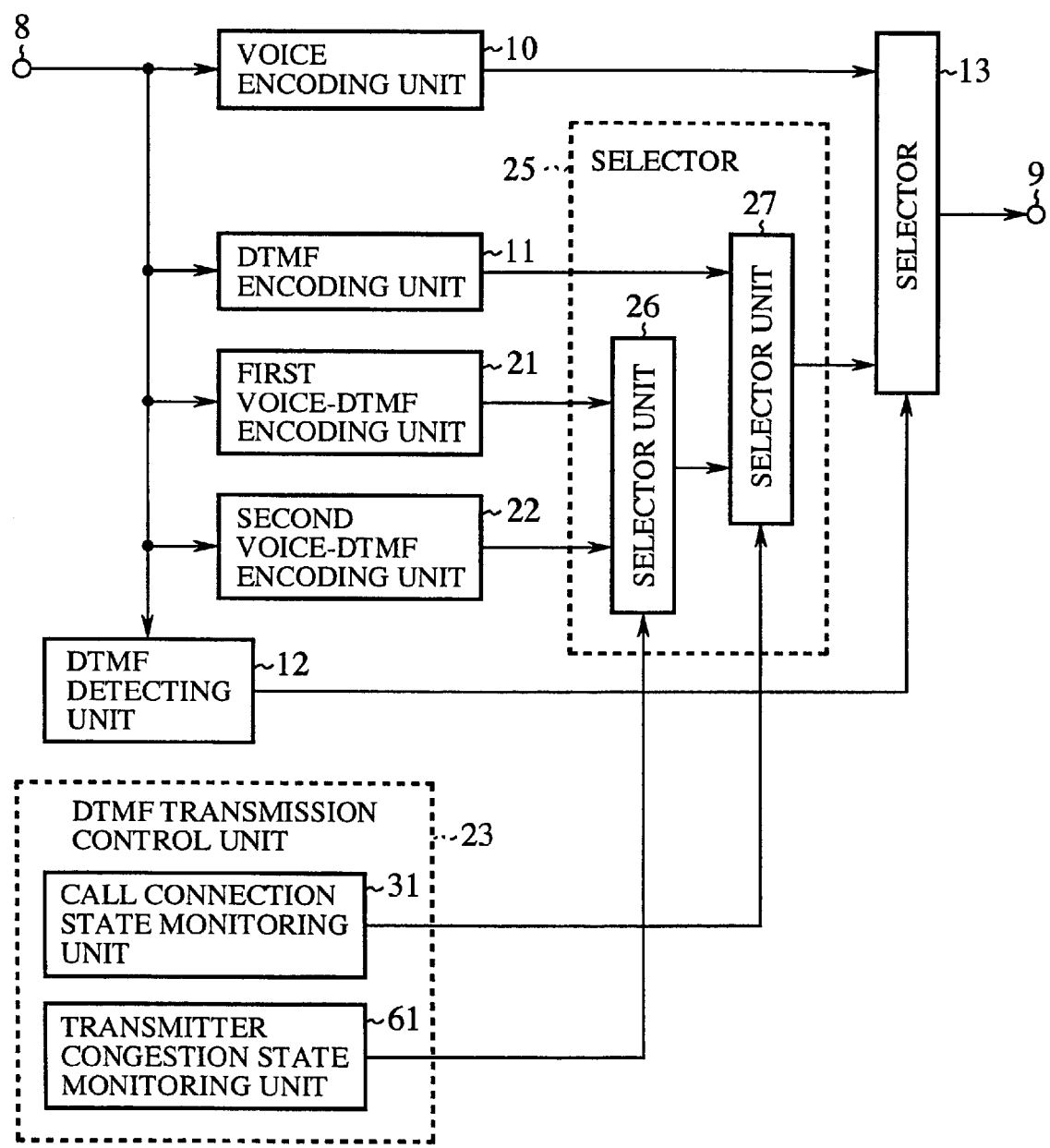
FIG. 22 is a block diagram showing a voice transmitter according to a twenty-second embodiment of the present invention.

FIG. 22 is a block diagram showing a voice transmitter according to a twenty-second embodiment of the present invention.

Referring to FIG. 22, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 21 denotes a first voice-DTMF encoding unit for performing encoding of an audio signal and a DTMF signal; and 22 denotes a second voice-DTMF encoding unit for performing encoding of an audio signal and a DTMF signal. Reference numeral 12 denotes a DTMF detecting unit for detecting and judging whether or not an input signal is a DTMF signal. Reference numeral 23 is an equivalence of the DTMF transmission control unit shown in the second embodiment, and comprises a call connection state monitoring unit 31 and a transmitter congestion state monitoring unit 61. In this connection, the transmitter congestion state monitoring unit 61 monitors a congestion state in the transmitter, and outputs a control signal for selectively controlling either the first voice-DTMF encoding unit 21 or the second voice-DTMF encoding unit 22 as a voice-DTMF encoding unit. On the other hand, the call connection state monitoring unit 31 monitors a call connection state, and outputs a control signal for selectively controlling the DTMF encoding unit 11, or one of the first DTMF encoding unit 21 and the second voice-DTMF encoding unit 22, which is selected by the transmission-line quality monitoring unit 51, for a DTMF signal transmission. Reference numeral 25 is an equivalence of the selector shown in the second embodiment, and comprises the selector units 26, 27. The selector unit 26 executes a first step of selecting an operation of the selector 25, which selects an output of the first voice-DTMF encoding unit 21 or that of the second voice-DTMF encoding unit 22 in response to an instruction from the transmitter congestion state monitoring unit 61. The selector unit 27 executes a second step, which selects an output of the DTMF encoding unit 11 or that of the selector unit 26 in response to an instruction from the call connection state monitoring unit 31 to output the selected output. Reference numeral 13 denotes a selector for selecting an output of the voice encoding unit 10 or the selected output of the selector unit 27 in response to an instruction from the DTMF detecting unit 12.

Next, the operation of the twenty-second embodiment will be described.

When a signal is inputted from the input terminal 8, an audio signal is voice-encoded in the voice encoding unit 10.

In addition, in the DTMF encoding unit 11, a DTMF audio signal is decoded into a DTMF numerical value. Moreover, in the first voice-DTMF encoding unit 21 and the second voice-DTMF encoding unit 22, the DTMF audio signal is voice-encoded as an audio signal. Here, assumed that the second voice-DTMF encoding unit 22 is an encoding unit for outputting encoded data, which encodes at a higher speed and is of better quality than those of the first voice-DTMF encoding unit 21.

The transmitter congestion state monitoring unit 61 monitors a congestion state in the transmitter, and if the congestion is higher than a certain threshold value, controls the selector unit 26 so that the selector unit 26 selects an output of the first voice-DTMF encoding unit 21, which generates small quantity of data, and is tolerable to an error. Otherwise, if the congestion is lower than the certain threshold value, the transmitter congestion state monitoring unit 61 controls the selector unit 26 so that an output of the second voice-DTMF encoding unit 22 is selected (a first step). Next, the call connection state monitoring unit 31 monitors a call connection state, if the current state is in the course of the call connection sequence in which a telephone conversation is not yet started, controls the selector unit 27 so that an output of the DTMF encoding unit 11 is selected. If the call connection state is busy in which the call connection sequence has already been finished, controls the selector unit 27 so that an output of the selector unit 26 is selectively output (a second step).

On the other hand, if the DTMF detecting unit 12 judged an input signal not to be a DTMF signal, the selector 13 selects an output of the voice encoding unit 10. As a result, a signal, which is voice-encoded in the voice encoding unit 10, is output to the transmission line side (output terminal) 9. Otherwise, the DTMF detecting unit 12 judged the input signal to be a DTMF signal, the selector 13 selects an output of the selector unit 27, and controls the output so that an output of the selector 25 or the selected output of the selector unit 27 is output to the transmission line side (output terminal) 9.

As described above, according to the twenty-second embodiment, the transmitter congestion state monitoring unit 61 and the call connection state monitoring unit 31 are used as the DTMF transmission control unit 23 of the second embodiment. Therefore, during a telephone conversation, selectively controlling the first voice-DTMF encoding unit 22 or the second voice-DTMF encoding unit 22 achieves high-quality transmission. This does not give an unpleasant feeling to a caller, even when a DTMF signal is detected false, as the DTMF signal is transmitted in the same manner as an audio signal, and reliably transmits a DTMF signal. In addition, selectively controlling the DTMF encoding unit 11 to decode a DTMF signal, when a DTMF is actually transmitted during a call connection sequence. Furthermore, if there is a fair possibility that data to be output will be discarded, due to a high congestion in the transmitter, selectively controlling the first voice-DTMF encoding unit 21, which generates small quantity of data, and is tolerable to an error, permits more reliable transmission of a DTMF signal. If there is a little possibility that data to be outputted will be discarded, due to a low congestion, selectively controlling the second voice-DTMF encoding unit 22 achieves high-quality transmission.

Twenty-third Embodiment

Figure 23:
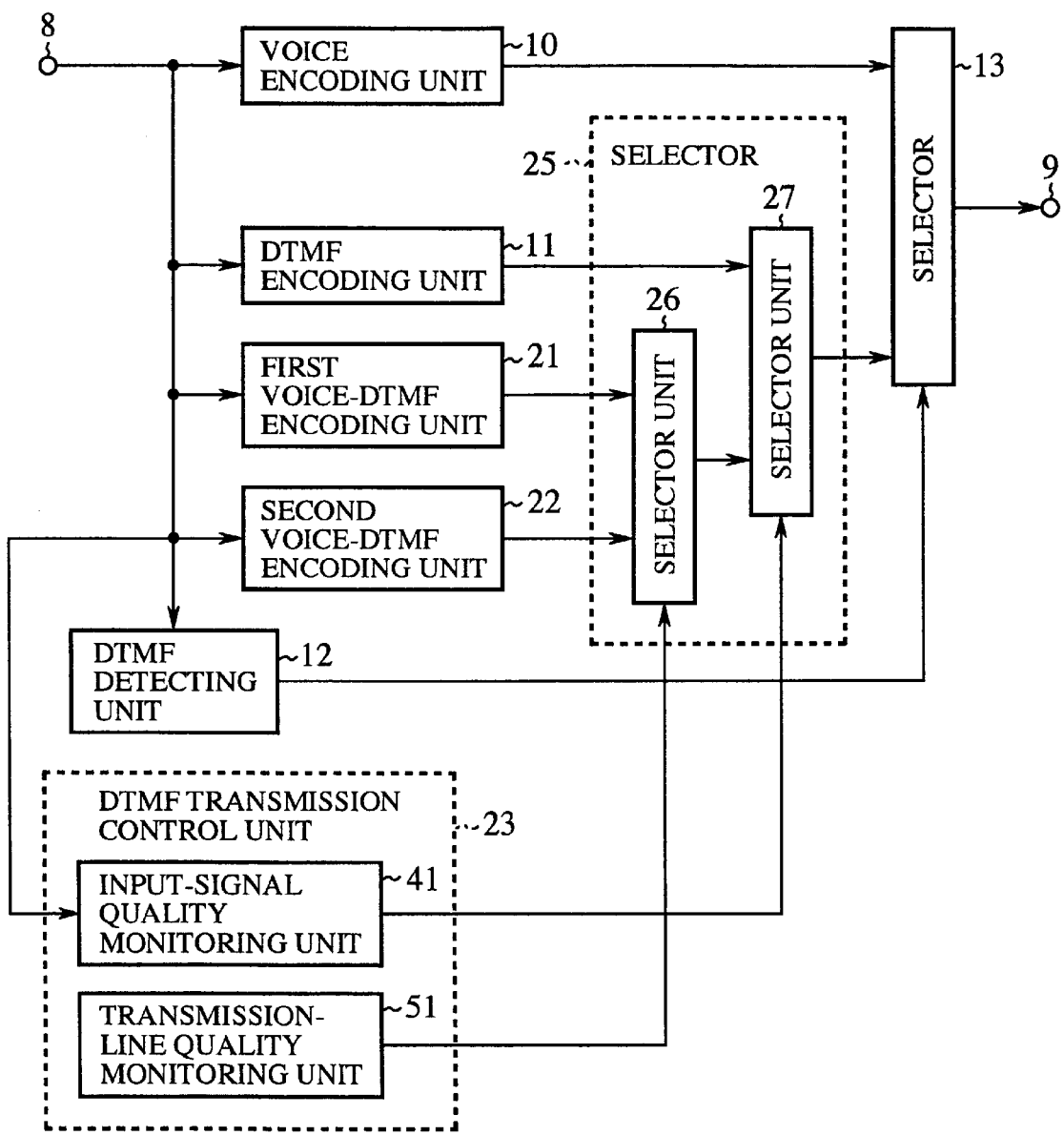
FIG. 23 is a block diagram showing a voice transmitter according to a twenty-third embodiment of the present invention.

FIG. 23 a block diagram showing a voice transmitter according to a twenty-third embodiment of the present invention.

Referring to FIG. 23, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 21 denotes a first voice-DTMF encoding unit for performing encoding of an audio signal and a DTMF signal; and 22 denotes a second voice-DTMF encoding unit for performing encoding of an audio signal and a DTMF signal. Reference numeral 12 denotes a DTMF detecting unit for detecting and judging whether or not an input signal is a DTMF signal. Reference numeral 23 is an equivalence of the DTMF transmission control unit shown in the second embodiment, and comprises the transmission-line quality monitoring unit 51 and the input-signal quality monitoring unit 41. In this connection, the transmission-line quality monitoring unit 51 monitors transmission quality of a transmission line, and outputs a control signal for selectively controlling either the first voice-DTMF encoding unit 21 or the second voice-DTMF encoding unit 22. In addition, the input-signal quality monitoring unit 41 monitors quality of an inputted audio signal and a DTMF signal, and outputs a control signal for selectively controlling the DTMF encoding unit 11, or one of the first DTMF encoding unit 21 and the second voice-DTMF encoding unit 22, which is selected by the transmission-line quality monitoring unit 51, for a DTMF signal transmission. Reference numeral 25 is an equivalence of the selector shown in the second embodiment, and comprises the selector units 26, 27. The selector unit 26 executes a first step of selecting an operation of the selector 25, which selects an output of the first voice-DTMF encoding unit 21 or that of the second voice-DTMF encoding unit 22 in response to an instruction from the transmission-line quality monitoring unit 51. The selector unit 27 executes a second step, which selects an output of the DTMF encoding unit 11 or that of the selector unit 26 in response to an instruction from the input-signal quality monitoring unit 41 to output the selected output. Reference numeral 13 denotes a selector for selecting an output of the voice encoding unit 10 or the selected output of the selector unit 27 in response to an instruction from the DTMF detecting unit 12.

Next, the operation of the twenty-third embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. Moreover, in the first voice-DTMF encoding unit 21 and the second voice-DTMF encoding unit 22, the DTMF audio signal is voice-encoded as an audio signal. Here, assumed that the second voice-DTMF encoding unit 22 is an encoding unit for outputting encoded data, which encodes at a higher speed and is of better quality than those of the first voice-DTMF encoding unit 21.

The transmission-line quality monitoring unit 51 monitors transmission quality of a transmission line, if quality of the transmission line is more poor than a certain threshold value, controls the selector unit 26 so that the selector unit 26 selects an output of the first voice-DTMF encoding unit 21, which outputs small quantity of data to the transmission line, and is tolerable to an error. If the quality of the transmission line is better than the certain threshold value, controls the selector unit 26 so that an output of the second voice-DTMF encoding unit 22 is selected (a first step). Next, the input-signal quality monitoring unit 41 monitors quality of an inputted audio signal and a DTMF signal, if the quality is better than a certain threshold value, the input-signal quality monitoring unit 41 judges that a DTMF signal is seldom detected false, and controls the selector unit 27 so that an output of the DTMF encoding unit 11 is selected. If the quality is more poor than the certain threshold level, the input-signal quality monitoring unit 41 judges that a DTMF signal is not seldom detected false, and controls the selector unit 27 so that an output of the selector unit 26 is selected.

On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the transmission line side (output terminal) 9. Otherwise, the DTMF detecting unit 12 judged the input signal to be a DTMF signal, the selector 13 selects an output of the selector unit 27, and controls the output so that an output of the selector 25 or the selected output of the selector unit 27 is output to the transmission line side (output terminal) 9.

As described above, according to the twenty-third embodiment, the transmission-line quality monitoring unit 51 and the input-signal quality monitoring unit 41 are used as the DTMF transmission control unit 23 of the second embodiment. Therefore, if there is a fair possibility that a DTMF signal will be detected false, selectively controlling the first voice-DTMF encoding unit 21 or the second voice-DTMF encoding unit 22 achieves high-quality transmission. This does not give an unpleasant feeling to a caller, even when a DTMF signal is detected false, as the DTMF signal is transmitted in the same manner as an audio signal, and reliably transmits a DTMF signal. Furthermore, if there is a fair possibility that a transmission error on the transmission line will be occurred, selectively controlling the first voice-DTMF encoding unit 21, which outputs small quantity of data to the transmission line, and is tolerable to an error, permits more reliable transmission of a DTMF signal. If there is a fair possibility that a transmission error on the transmission line will be occurred, selectively controlling the second voice-DTMF encoding unit 22 achieves high-quality transmission.

Twenty-fourth Embodiment

Figure 24:
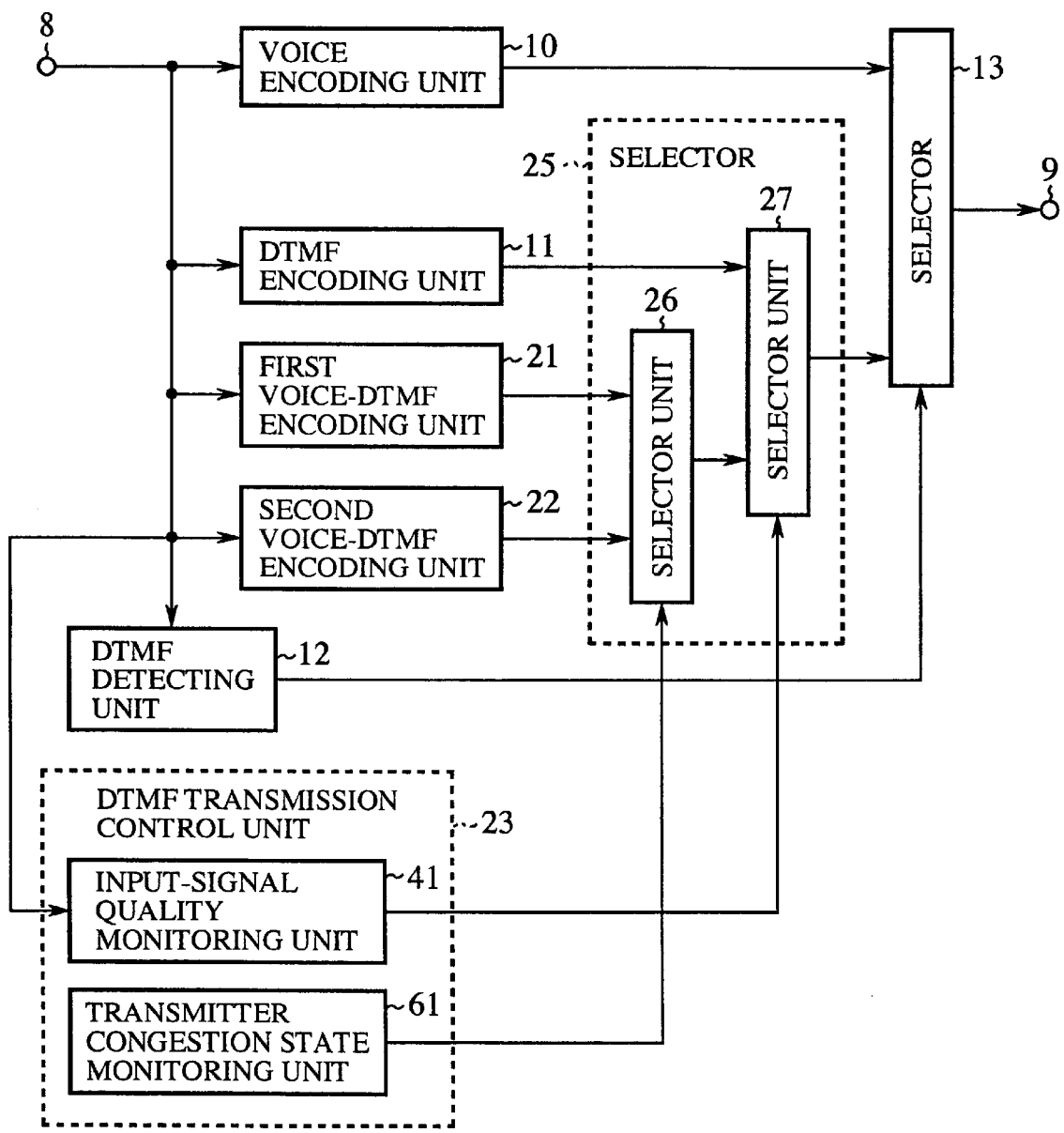
FIG. 24 is a block diagram showing a voice transmitter according to a twenty-fourth embodiment of the present invention.

FIG. 24 is a block diagram showing a voice transmitter according to a twenty-fourth embodiment of the present invention.

Referring to FIG. 24, reference numeral 8 denotes an input terminal of the voice transmitter; 9 an output terminal of the voice transmitter; 10 a voice encoding unit for voice-encoding an audio signal; and 11 a DTMF encoding unit for performing encoding of a DTMF signal. Reference numeral 21 denotes a first voice-DTMF encoding unit for performing encoding of an audio signal and a DTMF signal; and 22 denotes a second voice-DTMF encoding unit for performing encoding of an audio signal and a DTMF signal. Reference numeral 12 denotes a DTMF detecting unit for detecting and judging whether or not an input signal is a DTMF signal. Reference numeral 23 is an equivalence of the DTMF transmission control unit shown in the second embodiment, and comprises the transmitter congestion state monitoring unit 61 and the input-signal quality monitoring unit 41. In this connection, the transmitter congestion state monitoring unit 61 monitors a congestion state in the transmitter, and outputs a control signal for selecting and controlling either the first voice-DTMF encoding unit 21 or the second voice-DTMF encoding unit 22. In addition, the input-signal quality monitoring unit 41 monitors quality of an inputted audio signal and a DTMF signal, and outputs a control signal for selectively controlling the DTMF encoding unit 11, or one of the first DTMF encoding unit 21 and the second voice-DTMF encoding unit 22, which is selected by the transmission-line quality monitoring unit 51, for a DTMF signal transmission. Reference numeral 25 denotes an equivalence of the selector shown in the second embodiment, and comprises the selector units 26, 27. The selector unit 26 executes a first step of selecting an operation of the selector 25, which selects an output of the first voice-DTMF encoding unit 21 or that of the second voice-DTMF encoding unit 22 in response to an instruction from the transmitter congestion state monitoring unit 61. The selector unit 27 executes a second step, which selects an output of the DTMF encoding unit 11 or that of the selector unit 26 in response to an instruction from the input-signal quality monitoring unit 41 to output the selected output. Reference numeral 13 is a selector for selecting an output of the voice encoding unit 10 or the selected output of the selector unit 27 in response to an instruction from the DTMF detecting unit 12.

Next, the operation of the twenty-fourth embodiment will be described.

When a signal is inputted from the input terminal 8, an audio signal is voice-encoded in the voice encoding unit 10. In addition, in the DTMF encoding unit 11, a DTMF audio signal is decoded into a DTMF numerical value. Moreover, in the first voice-DTMF encoding unit 21 and the second voice-DTMF encoding unit 22, the DTMF audio signal is voice-encoded as an audio signal. Here, assumed that the second voice-DTMF encoding unit 22 is an encoding unit for outputting encoded data, which encodes at a higher speed and is of better quality than those of the first voice-DTMF encoding unit 21.

The transmitter congestion state monitoring unit 61 monitors a congestion state in the transmitter, and if the congestion is higher than a certain threshold value, controls the selector unit 26 so that the selector unit 26 selects an output of the first voice-DTMF encoding unit 21, which generates small quantity of data, and is tolerable to an error. If the congestion is lower than the certain threshold value, the transmitter congestion state monitoring unit 61 controls the selector unit 26 so that an output of the second voice-DTMF encoding unit 22 is selected (a first step). Next, the input-signal quality monitoring unit 41 monitors quality of an inputted audio signal and a DTMF signal, if the quality is better than a certain threshold value, the input-signal quality monitoring unit 41 judges that a DTMF signal is seldom detected false, and controls the selector unit 27 so that an output of the DTMF encoding unit 11 is selected. If the quality is more poor than the certain threshold value, the input-signal quality monitoring unit 41 judges that a DTMF signal is not seldom detected false, and controls the selector unit 27 so that an output of the selector unit 26 is selected.

On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the transmission line side (output terminal) 9. Otherwise, the DTMF detecting unit 12 judged the input signal to be a DTMF signal, the selector 13 selects an output of the selector unit 27, and controls the output so that an output of the selector 25 or the selected output of the selector unit 27 is output to the transmission line side (output terminal) 9.

As described above, according to the twenty-fourth embodiment, the transmitter congestion state monitoring unit 61 and the input-signal quality monitoring unit 41 are used as the DTMF transmission control unit 23 of the second embodiment. Therefore, if there is a fair possibility that a DTMF signal will be detected false, selectively controlling the first voice-DTMF encoding unit 21 or the second voice-DTMF encoding unit 22 achieves high-quality transmission. This does not give an unpleasant feeling to a caller, even when a DTMF signal is detected false, as the DTMF signal is transmitted in the same manner as an audio signal, and reliably transmits a DTMF signal. Furthermore, if there is a fair possibility that data to be output will be discarded, due to a high congestion in the transmitter, selectively controlling the first voice-DTMF encoding unit 21, which generates small quantity of data, and is tolerable to an error, permits more reliable transmission of a DTMF signal. If there is a little possibility that data to be output will be discarded, due to a low congestion, selectively controlling the second voice-DTMF encoding unit 22 achieves high-quality transmission.

Twenty-fifth Embodiment

Figure 25:
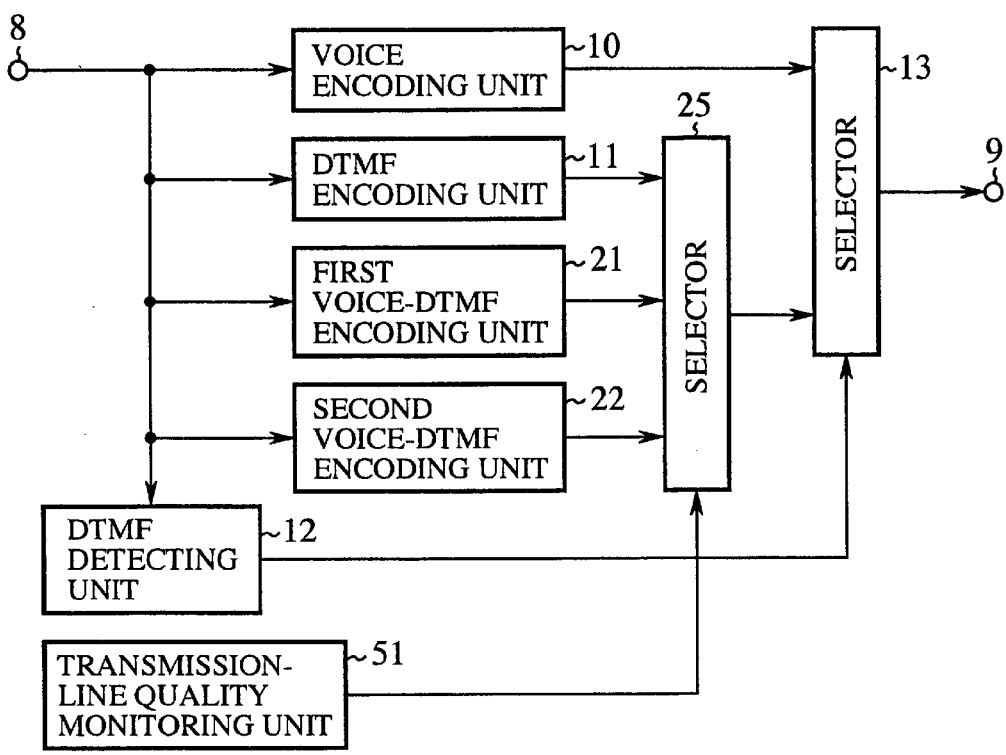
FIG. 25 is a block diagram showing a voice transmitter according to a twenty-fifth embodiment of the present invention.

FIG. 25 is a block diagram showing a voice transmitter according to a twenty-fifth embodiment of the present invention.

Referring to FIG. 25, reference numeral 8 denotes an input terminal of the voice transmitter; 9 an output terminal of the voice transmitter; and 10 a voice encoding unit for voice-encoding an audio signal. Reference numeral 11 denotes a DTMF encoding unit for performing encoding of a DTMF signal; 21 a first voice-DTMF encoding unit for performing encoding of an audio signal and a DTMF signal; 22 a second voice-DTMF encoding unit for performing encoding of an audio signal and a DTMF signal. In this case, the second voice-DTMF encoding unit 22 is an encoding unit for outputting encoding data, which encodes at a higher speed and is of better quality than those of the first voice-DTMF encoding unit 21. Reference numeral 12 denotes a DTMF detecting unit for detecting and judging whether or not an input signal is a DTMF signal. Reference numeral 51 denotes a transmission-line quality monitoring unit for monitoring transmission quality of a transmission line, and for, depending on the detected level of the transmission quality, outputting a control signal for selectively controlling a selector 13 to select a unit from any one of those including the DTMF encoding unit 11, the first voice-DTMF encoding unit 21, and the second voice-DTMF encoding unit 22 for a DTMF signal transmission. Reference numeral 25 denotes a selector for selecting an output from any one of those including the DTMF encoding unit 11, the first voice-DTMF encoding unit 21, and the second voice-DTMF encoding unit 22, in response to an instruction from the transmission-line quality monitoring unit 51. Reference numeral 13 denotes a selector for selecting an output of the voice encoding unit 10 or that of the selector 25 in response to an instruction from the DTMF detecting unit 12.

Next, the operation of the twenty-fifth embodiment will be described.

When a signal is inputted to the input terminal 8, an audio signal is voice-encoded in the voice encoding unit 10. In addition, the DTMF encoding unit 11 decodes the DTMF audio signal into a DTMF numerical value. Moreover, in the first voice-DTMF encoding unit 21 and in the second voice-DTMF encoding unit 22, the DTMF audio signal is voice-encoded as an audio signal.

The transmission-line quality monitoring unit 51 monitors transmission quality of a transmission line, and if the detected level of the transmission line quality is more poor than a certain threshold value A, controls the selector 25 so that an output of the DTMF encoding unit 11, which has higher error tolerance on the transmission line, is selected. In addition, if the detected level of the transmission line quality is better than the certain threshold value A and more poor than a certain threshold value B, an unpleasant feeling is not given to a caller, even when a DTMF signal is detected false, and the second voice-DTMF encoding unit 22 generates small quantity of data. Therefore, the transmission-line quality monitoring unit 51 controls the selector 25 so that the selector 25 selects an output of the first voice-DTMF encoding unit 21, which suffers from fewer errors on the transmission line than that of the second voice-DTMF encoding unit 22. If the detected level of the transmission line quality is better than the threshold value B, the transmission-line quality monitoring unit 51 controls the selector 25 so that the selector 25 selects an output of the second voice-DTMF encoding unit 22, which does not give an unpleasant feeling to the caller, even when a DTMF signal is detected false. Here, assumed that the threshold value A is a value of the transmission line quality, which is more poor than the threshold value B.

On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the transmission line side (output terminal) 9. If the DTMF detecting unit 12 judged the input signal to be a DTMF signal, the selector 13 selects the DTMF signal output of the selector 25, and outputs it to the transmission line side (output terminal) 9. To be more specific, in this case, the DTMF signal is outputted from any one of those including the DTMF encoding unit 11 in which the DTMF signal is encoded, the first voice-DTMF encoding unit 21 in which the DTMF signal is voice-encoded, and the second voice-DTMF encoding unit 22 in which the DTMF signal is voice-encoded.

As described above, according to the twenty-fifth embodiment, the transmission-line quality monitoring unit 51 is used as the DTMF transmission control unit 23 of the second embodiment. Therefore, if there is a fair possibility that a transmission error on the transmission line will be occurred, selectively controlling the DTMF encoding unit 25 achieves high-quality transmission, which enables reliable transmission of a DTMF signal. If there is a little possibility that a transmission error on the transmission line will be occurred, selectively controlling the first voice-DTMF encoding unit 21, and if there is a littler possibility that a transmission error on the transmission line will be occurred, selectively controlling the second voice-DTMF encoding unit 22 achieves high-quality transmission. This does not give an unpleasant feeling to a caller, even when a DTMF signal is detected false, as the DTMF signal is transmitted in the same manner as an audio signal.

Twenty-sixth Embodiment

Figure 26:
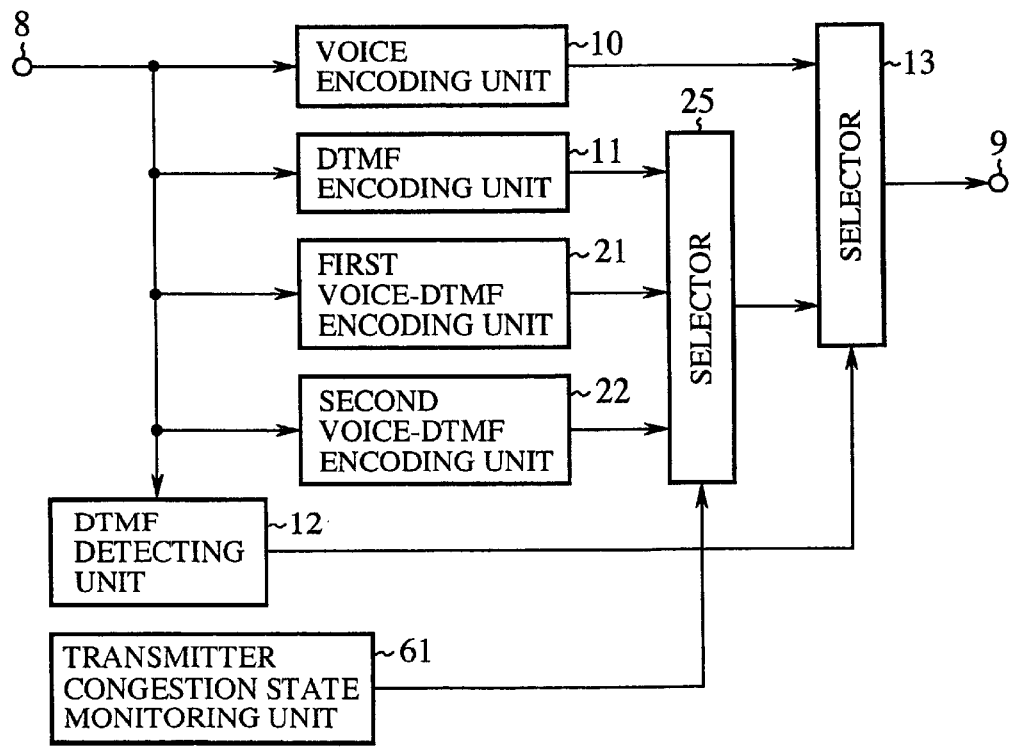
FIG. 26 is a configuration diagram showing a voice transmitter according to a twenty-sixth embodiment of the present invention.
Figure 27:
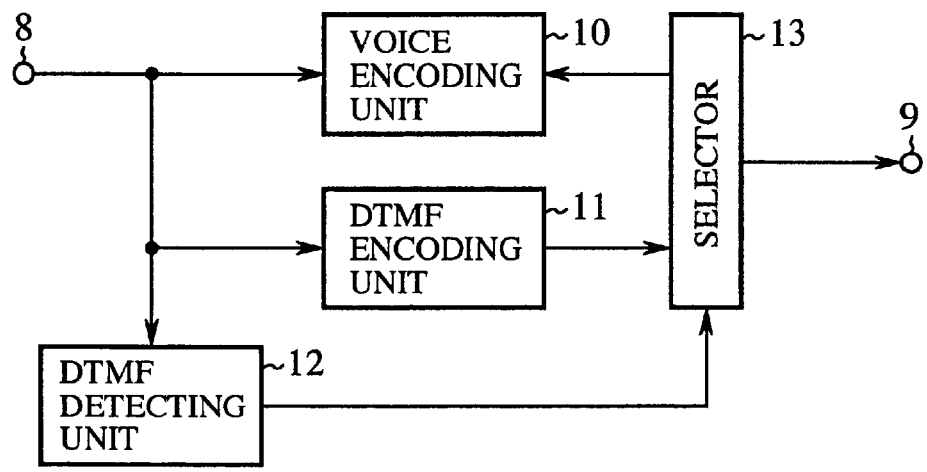
FIG. 27 is a block diagram showing a conventional voice transmitter.
Figure 28:
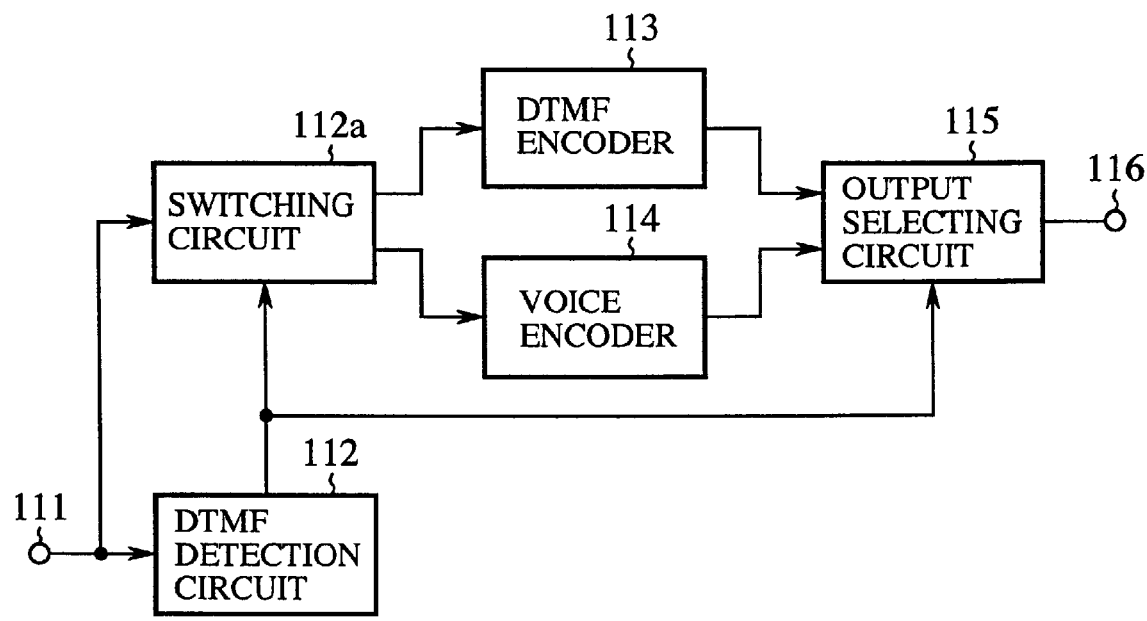
FIG. 28 is a block diagram showing a conventional voice encoder.

FIG. 26 is a block diagram showing a voice transmitter according to a twenty-sixth embodiment of the present invention.

Referring to FIG. 26, reference numeral 8 denotes an input terminal of the voice transmitter; 9 an output terminal of the voice transmitter; and 10 a voice encoding unit for voice-encoding an audio signal. Reference numeral 11 denotes a DTMF encoding unit for performing encoding of a DTMF signal; 21 a first voice-DTMF encoding unit for performing encoding of an audio signal and a DTMF signal; and 22 a second voice-DTMF encoding unit for performing encoding of an audio signal and a DTMF signal. Here, assumed that the second voice-DTMF encoding unit 22 is an encoding unit for outputting encoding data, which encodes at a higher speed and is of better quality than those of the first voice-DTMF encoding unit 21. Reference numeral 12 denotes a DTMF detecting unit for detecting and judging whether or not an input signal is a DTMF signal. Reference numeral 61 denotes a transmission-line quality monitoring unit for monitoring a congestion state in the transmitter, and for, depending on the detected level of the congestion state, outputting a control signal for selectively controlling a selector 25 to select a unit from any one of those including the DTMF encoding unit 11, the first voice-DTMF encoding unit 21, and the second voice-DTMF encoding unit 22 for a DTMF signal transmission. Reference numeral 25 denotes a selector for selecting an output from any one of those including the DTMF encoding unit 11, the first voice-DTMF encoding unit 21, and the second voice-DTMF encoding unit 22, in response to an instruction from the transmitter congestion state monitoring unit 61. Reference numeral 13 denotes a selector for selecting an output of the voice encoding unit 10 or that of the selector 25 in response to an instruction from the DTMF detecting unit 12.

Next, the operation of the twenty-sixth embodiment will be described.

When a signal is inputted to the input terminal 8, an audio signal is voice-encoded in the voice encoding unit 10. In addition, the DTMF encoding unit 11 decodes the DTMF audio signal into a DTMF numerical value. Moreover, in the first voice-DTMF encoding unit 21 and in the second voice-DTMF encoding unit 22, the DTMF audio signal is voice-encoded as an audio signal.

The transmitter congestion state monitoring unit 61 monitors a congestion in the transmitter, if the detected level of the transmitter congestion state is higher than a certain threshold value A, judges that data will be often discarded without outputting it to the transmission line, and controls the selector 25 so that an output of the DTMF encoding unit 11, which has higher tolerance to degradation in transmission quality, is selected. In addition, if the detected level of the transmitter congestion is lower than the threshold value A and higher than a certain threshold value B, an unpleasant feeling is not be given to a caller, even when a DTMF signal is detected false, and the second voice-DTMF encoding unit 22 generates small quantity of data. Therefore, the transmitter congestion state monitoring unit 61 controls the selector 25 so that the selector 25 selects an output of the first voice-DTMF encoding unit 21, which suffers from fewer degradation in transmission quality than that of the second voice-DTMF encoding unit 22. If the detected level of the transmitter congestion is lower than the certain threshold value B, the transmitter congestion state monitoring unit 61 controls the selector 25 so that the selector 25 selects an output of the second voice-DTMF encoding unit 22, which does not give an unpleasant feeling to the caller, even when a DTMF signal is detected false. Here, assumed that the threshold value A is a value of the transmission line quality, which is more poor than the threshold value B for a high congestion.

On the other hand, if the DTMF detecting unit 12 judged the input signal not to be a DTMF signal, the selector 13 selects an output of the voice encoding unit 10. As a result, a signal, which is voice-encoded in the voice encoding unit 10, is output to the transmission line side (output terminal) 9. If the DTMF detecting unit 12 judged the input signal to be a DTMF signal, the selector 13 selects the DTMF signal output of the selector 25, and outputs it to the transmission line side (output terminal) 9. To be more specific, in this case, the DTMF signal is selected from any one of those including the DTMF encoding unit 11 in which the DTMF signal is encoded, the first voice-DTMF encoding unit 21 in which the DTMF signal is voice-encoded, and the second voice-DTMF encoding unit 22 in which the DTMF signal is voice-encoded.

As described above, according to the twenty-sixth embodiment, the transmitter congestion state monitoring unit 61 is used as the DTMF transmission control unit 23 of the second embodiment. Therefore, if there is a fair possibility that transmission quality will be degraded, due to the congestion in the transmitter, selectively controlling the DTMF encoding unit 11 achieves high-quality transmission, which enables reliable transmission of a DTMF signal. If there is a little possibility that transmission quality will be degraded, due to the congestion in the transmitter, selectively controlling the first voice-DTMF encoding unit 21, and if there is a littler possibility that transmission quality will be degraded, due to the congestion in the transmitter, selectively controlling the second voice-DTMF encoding unit 22 achieves high-quality transmission. This does not give an unpleasant feeling to a caller, even when a DTMF signal is detected false, as the DTMF signal is transmitted in the same manner as an audio signal.

As described above, according to the present invention, the voice transmitter for encoding a DTMF signal and an audio signal and for transmitting the encoded signals, comprises voice encoding means for performing voice-encoding of an inputted audio signal; DTMF encoding means for performing encoding of an inputted DTMF signal; voice-DTMF encoding means for performing voice encoding of an inputted audio signal and a DTMF signal; a first selector for selecting a DTMF signal which is encoded in the DTMF encoding means, or a DTMF signal which is voice-encoded in the voice-DTMF encoding means; DTMF transmission control means for monitoring quality of an input signal and a transmission line, congestion of the transmitter, or a call connection, etc., and for controlling selecting operation of the first selector depending on the state; DTMF detecting means for detecting that an input signal is a DTMF signal; and a second selector for selecting an output of the voice encoding means if the DTMF detecting means judged the inputted signal not to be a DTMF signal, and for selecting the output signal selected by the first selector if the DTMF detecting means judged the inputted signal to be a DTMF signal.

Therefore, selectively controlling the DTMF transmission means appropriately an unpleasant feeling is not given to a caller, even when a DTMF signal is detected false during a telephone conversation. When a DTMF signal is actually transmitted, it is possible to achieve high-quality transmission, which enables reliable transmission of the DTMF signal.

According to the present invention, the voice-DTMF encoding means voice-encodes both of an audio signal and a DTMF signal at a higher speed than a voice-encoding speed of the voice encoding means. Therefore, selectively controlling the DTMF transmission means, an unpleasant feeling is not be given to a caller, even when a DTMF signal is detected false during a telephone conversation. When a DTMF signal is actually transmitted, it is possible to achieve high-quality transmission, which enables reliable transmission of the DTMF signal.

According to the present invention, the voice-DTMF encoding means incorporates an encoding algorithm, which is specialized in a DTMF signal encoded at the same speed as a voice-encoding speed of the voice encoding means, and encodes the DTMF signal of poor voice quality. Therefore, selectively controlling the DTMF transmission means gives no unpleasant feeling to a caller, even when the DTMF signal is detected false during a telephone conversation. When a DTMF signal is actually transmitted, it is possible to realize high-quality transmission, which enables reliable transmission of the DTMF signal.

According to the present invention, the DTMF transmission control means is a call connection state monitoring control means for monitoring a call connection state. and for, depending on the call connection state, controlling the first selector so that either an output of a DTMF encoding unit or that of a voice-DTMF encoding unit is used for a DTMF signal transmission. Therefore, selecting the voice-DTMF encoding means during a telephone conversation gives no unpleasant feeling to a caller, even when the DTMF signal is detected false, as the DTMF signal is transmitted in the same manner as an audio signal. When a DTMF signal is actually transmitted during a call connection sequence, selecting the DTMF encoding means to decode the DTMF signal achieves high-quality transmission, which enables reliable transmission of the DTMF signal.

According to the present invention, the DTMF transmission control means is an input-signal quality monitoring control means for monitoring quality of an inputted audio signal and a DTMF signal, and for, depending on the quality, controlling the first selector so that either the DTMF encoding means or the voice-DTMF encoding means is selected for a DTMF signal transmission. Therefore, if there is a fair possibility that a DTMF signal will be degraded, selectively controlling the voice-DTMF encoding means gives no unpleasant feeling to a caller, even when the DTMF signal is detected false, as the DTMF signal is transmitted in the same manner as an audio signal, and it is possible to realize a high-quality transmission system, which enables reliable transmission of a DTMF signal.

According to the present invention, the DTMF transmission control means is a transmission-line quality monitoring control means for monitoring transmission quality of a transmission line, and for, depending on the transmission-line quality, controlling the first selector so that either the DTMF encoding means or the voice-DTMF encoding means is selected for a DTMF signal transmission. Therefore, if there is a fair possibility that a transmission error on the transmission line will be occurred, selecting the DTMF encoding means achieves high-quality transmission, which enables reliable transmission of a DTMF signal. If there is a little possibility that a transmission error on the transmission line will be occurred, selectively controlling the voice-DTMF encoding means achieves high-quality transmission. This does not give an unpleasant feeling to a caller, even when a DTMF signal is detected false, as the DTMF signal is transmitted in the same manner as an audio signal.

According to the present invention, the DTMF transmission control means is a transmitter congestion state monitoring control means for monitoring a congestion state in the transmitter, and for, due on the congestion, controlling the first selector so that either the DTMF encoding means or the voice-DTMF encoding means is selected for a DTMF signal transmission. Therefore, if there is a fair possibility that transmission quality will be degraded, judging from the congestion state in the transmitter, selecting the DTMF encoding means achieves high-quality transmission, which enables reliable transmission of a DTMF signal. If there is a little possibility that transmission quality will be degraded, judging from the congestion state in the transmitter, selectively controlling the voice-DTMF encoding means achieves high-quality transmission. This does not give an unpleasant feeling to a caller, even when a DTMF signal is detected false, as the DTMF signal is transmitted in the same manner as an audio signal.

According to the present invention, the voice transmitter for encoding a DTMF signal and an audio signal and transmitting the encoded signals, comprises voice encoding means for performing voice-encoding of an inputted audio signal; DTMF encoding means for performing encoding of an inputted DTMF signal; first voice-DTMF encoding means for performing voice encoding of an inputted audio signal and a DTMF signal; second voice-DTMF encoding means for performing voice encoding of an inputted audio signal and a DTMF signal, and for outputting the encoded data, which encodes at a higher speed and is of better quality than those of the first voice-DTMF encoding means; a first selector for selecting a DTMF signal encoded in the DTMF encoding means, a DTMF signal voice-encoded in the first voice-DTMF encoding means, and a DTMF signal which is voice-encoded in the second voice-DTMF encoding means; DTMF transmission control means for monitoring quality of an input signal and a transmission line, congestion of the transmitter, or a call connection, etc., and for controlling selecting operation of the first selector depending on the state; DTMF detecting means for detecting that an inputted signal is a DTMF signal; and a second selector for selecting an output of the voice encoding means if the DTMF detecting means judged the inputted signal not to be a DTMF signal, and for selecting the output signal selected by the first selector if the DTMF detecting means judged the inputted signal to be a DTMF signal. Therefore, selectively controlling the DTMF transmission means gives no unpleasant feeling to a caller, even when a DTMF signal is detected false during a telephone conversation. When a DTMF signal is actually transmitted, it is possible to realize high-quality transmission, which enables reliable transmission of the DTMF signal.

According to the present invention, the DTMF transmission control means comprises transmission-line quality monitoring control means for monitoring transmission quality of a transmission line, and for, depending on the transmission line quality, controlling the first selector so that an output of the first voice-DTMF encoding means or that of the second voice-DTMF encoding means is selected in a first step; a call connection state monitoring control means comprising the steps of monitoring a call connection state, and for, depending on the call connection state, controlling the first selector so that an output of the DTMF encoding means, or that of the first or the second voice-DTMF encoding means, which is selected in the first step, is selected in a second step for a DTMF signal transmission. Therefore, selectively controlling the first voice-DTMF encoding means or the second voice-DTMF encoding means during a telephone conversation gives no unpleasant feeling to a caller, even when the DTMF signal is detected false, as the DTMF signal is transmitted in the same manner as an audio signal. When a DTMF signal is actually transmitted during a call connection sequence, selectively controlling the DTMF encoding means to decode the DTMF signal achieves high-quality transmission, which enables reliable transmission of the DTMF signal. In addition, if there is a fair possibility that a transmission error on the transmission line will be occurred, selecting the first voice-DTMF encoding means, which transmits small quantity of data to the transmission line, and is tolerable to an error, permits more reliable transmission of a DTMF signal. If there is a little possibility that a transmission error on the transmission line will be occurred, selecting the second voice-DTMF encoding means achieves high-quality transmission.

According to the present invention, the DTMF transmission control means comprises transmission-line quality monitoring control means for monitoring transmission quality of a transmission line, and for, depending on the transmission line quality, controlling the first selector so that an output of the first voice-DTMF encoding means or that of the second voice-DTMF encoding means is selected in a first step; input-signal quality monitoring control means for monitoring quality of an inputted audio signal and a DTMF signal, and for depending on the quality, controlling the first selector so that an output of the DTMF encoding means, or the output of the first or the second voice-DTMF encoding means, which is selected in the first step, is selected in a second step for a DTMF signal transmission.

Therefore, if there is a fair possibility that a DTMF signal will be detected false, selectively controlling the first voice-DTMF encoding means or the second voice-DTMF encoding means gives no unpleasant feeling to a caller, even when a DTMF signal is detected false, as the DTMF signal is transmitted in the same manner as an audio signal, and it is possible to realize high-quality transmission, which enables reliable transmission of a DTMF signal. In addition, if there is a fair possibility that a transmission error on the transmission line will be occurred, selecting the first voice-DTMF encoding means, which transmits small quantity of data to the transmission line, and is tolerable to an error, permits more reliable transmission of a DTMF signal. If there is a little possibility that a transmission error on the transmission line will be occurred, selecting the second voice-DTMF encoding means achieves high-quality transmission.

According to the present invention, the DTMF transmission control means comprises transmitter congestion state monitoring control means for monitoring a congestion state in the transmitter, and for, depending on the congestion state, controlling the first selector so that an output of the first voice-DTMF encoding means or that of the second voice-DTMF encoding means is selected in a first step; and input-signal quality monitoring control means for monitoring quality of an inputted audio signal and a DTMF signal, and for, depending on the quality, controlling the first selector so that an output of the DTMF encoding means, or the output of the first or the second voice-DTMF encoding means, which is selected in the first step, is selected in a second step for a DTMF signal transmission.

Therefore, if there is a fair possibility that a DTMF signal will be detected false, selectively controlling the first voice-DTMF encoding means or the second voice-DTMF encoding means gives no unpleasant feeling to a caller, even when a DTMF signal is detected false, as the DTMF signal is transmitted in the same manner as an audio signal, and it is possible to realize high-quality transmission, which enables reliable transmission of a DTMF signal. In addition, if there is a fair possibility that data to be output will be discarded, due to a high congestion in the transmitter, selecting the first voice-DTMF encoding means, which generates small quantity of data, and is tolerable to an error, permits more reliable transmission of a DTMF signal. If there is a little possibility that data to be output will be discarded, due to a low congestion, selecting the second voice-DTMF encoding means achieves high-quality transmission.

What is claimed is:

1. A voice transmitter for encoding and transmitting a DTMF signal and an audio signal, comprising:

voice encoding means for performing voice-encoding of an inputted audio signal;

DTMF encoding means for performing encoding of an inputted DTMF signal;

voice-DTMF encoding means for performing voice encoding of an inputted audio signal and a DTMF signal;

a first selector for selecting the DTMF signal encoded in the DTMF encoding means, or the DTMF signal voice-encoded in the voice-DTMF encoding means;

DTMF transmission control means for monitoring quality of an input signal and a transmission line, congestion of the transmitter, or a call connection, and for controlling selecting operation of the first selector depending on the monitored result;

DTMF detecting means for detecting that an inputted signal is a DTMF signal; and a second selector for selecting an output of the voice encoding means when the DTMF detecting means judged the inputted signal not to be a DTMF signal, and for selecting an output signal selected by the first selector when the DTMF detecting means judged the inputted signal to be a DTMF signal.

2. The voice transmitter according to claim 1, wherein the voice-DTMF encoding means voice-encodes both of an audio signal and a DTMF signal at a higher speed than a voice-encoding speed of the voice encoding means.

3. The voice transmitter according to claim 1, wherein the voice-DTMF encoding means incorporates an encoding algorithm, which is specialized in a DTMF signal, and encodes the DTMF signal of poor voice quality at the same speed as voice-encoding speed of the voice encoding means.

4. The voice transmitter according to claim 1, wherein the DTMF transmission control means is call connection state monitoring control means for monitoring a call connection state, and for, depending on the call connection state, controlling the first selector to select either an output of a DTMF encoding unit or that of a voice-DTMF encoding unit for a DTMF signal transmission.

5. The voice transmitter according to claim 1, wherein the DTMF transmission control means is input-signal quality monitoring control means for monitoring quality of an inputted audio signal and a DTMF signal, and for, depending on the quality, controlling the first selector to select either the DTMF encoding means or the voice-DTMF encoding means for a DTMF signal transmission.

6. The voice transmitter according to claim 1, wherein the DTMF transmission control means is transmission-line quality monitoring control means for monitoring transmission quality on a transmission line, and for, depending on the transmission-line quality, controlling the first selector to select either the DTMF encoding means or the voice-DTMF encoding means for a DTMF signal transmission.

7. The voice transmitter according to claim 6, wherein the transmission-line quality monitoring control means is data-error-rate monitoring control means for monitoring a data error rate on a transmission line, and for, depending on the data error rate, controlling the first selector to select either the DTMF encoding means or the voice-DTMF encoding means for a DTMF signal transmission.

8. The voice transmitter according to claim 6, wherein the transmission-line quality monitoring control means is IP-packet loss-rate monitoring control means for monitoring an IP packet loss rate on the transmission line, and for, depending on the IP-packet loss-rate, controlling the first selector to select either the DTMF encoding means or the voice-DTMF encoding means for a DTMF signal transmission.

9. The voice transmitter according to claim 6, wherein the transmission-line quality monitoring control means is IP-packet delay-variation-quantity monitoring control means for monitoring incoming delay variation quantity of IP packet on a transmission line, and for, depending on the incoming delay variation quantity, controlling the first selector to select either the DTMF encoding means or the voice-DTMF encoding means for a DTMF signal transmission.

10. The voice transmitter according to claim 6, wherein the transmission-line quality monitoring control means is ATM cell loss-rate monitoring control means for monitoring an ATM cell loss rate on a transmission line, and for, depending on the ATM cell loss rate, controlling the first selector to select either the DTMF encoding means or the voice-DTMF encoding means for a DTMF signal transmission.

11. The voice transmitter according to claim 6, wherein the transmission-line quality monitoring control means is ATM cell delay-variation-quantity monitoring control means for monitoring an ATM cell loss rate on a transmission line and ATM cell incoming delay variation quantity on the transmission line, and for, depending on the ATM cell incoming delay variation quantity, controlling the first selector to select either the DTMF encoding means or the voice-DTMF encoding means for a DTMF signal transmission.

12. The voice transmitter according to claim 1, wherein the DTMF transmission control means is transmitter congestion state monitoring control means for monitoring a congestion state in the transmitter, and for, depending on the congestion state, controlling the first selector to select either the DTMF encoding means or the voice-DTMF encoding means for a DTMF signal transmission.

13. The voice transmitter according to claim 12, wherein the transmitter congestion state monitoring control means is freeze out ratio monitoring control means for monitoring a freeze out ratio, which is caused by congestion of an audio signal to be transmitted in the transmitter, and for, depending on the freeze out ratio, controlling the first selector to select either the DTMF encoding means or the voice-DTMF encoding means for a DTMF signal transmission.

14. The voice transmitter for encoding a DTMF signal and an audio signal and for transmitting the signals, comprising:
   voice encoding means for performing voice-encoding of an inputted audio signal;
   DTMF encoding means for performing encoding of an inputted DTMF signal;
   first voice-DTMF encoding means for performing voice encoding of an inputted audio signal and a DTMF signal;
   a second voice-DTMF encoding means for performing voice encoding of an inputted audio signal and a DTMF signal, and for outputting the encoded data, which is encoded at a higher speed and is of better quality than those of the first voice-DTMF encoding means;
   a first selector for selecting a DTMF signal encoded in the DTMF encoding means, a DTMF signal voice-encoded in the first voice-DTMF encoding means, or a DTMF signal voice-encoded in the second voice-DTMF encoding means;
   DTMF transmission control means for monitoring quality of an inputted signal and a transmission line, congestion of the transmitter, or a call connection, and for controlling selecting operation of the first selector depending on the monitored result;
   DTMF detecting means for detecting that an inputted signal is a DTMF signal; and
   a second selector for selecting an output of the voice encoding means when the DTMF detecting means judged the inputted signal not to be a DTMF signal, and for selecting an output signal selected by the first selector when the DTMF detecting means judged the inputted signal to be a DTMF signal.

15. The voice transmitter according to claim 14, wherein the DTMF transmission control means comprises
   transmission-line quality monitoring control means for monitoring a transmission quality of a transmission line; and for, depending on the transmission line quality, controlling the first selector to select an output of the first voice-DTMF encoding means or that of the second voice-DTMF encoding means is selected in a first step; and
   call connection state monitoring control means for monitoring a call connection state, and for, depending on the call connection state, controlling the first selector so that an output of the DTMF encoding means, or that of the first or the second voice-DTMF encoding means, which is selected in the first step, is selected in a second step for a DTMF signal transmission.

16. A voice transmitter according to claim 14, wherein the DTMF transmission control means comprises
   transmitter congestion state monitoring control means for monitoring a congestion state in the transmitter, and for, depending on the congestion state, controlling the first selector so that an output of the first voice-DTMF encoding means or that of the second voice-DTMF encoding means is selected in a first step; and
   call connection state monitoring control means for monitoring a call connection state, and for, depending on the call connection state, controlling the first selector so that an output of the DTMF encoding means, or that of the first or the second voice-DTMF encoding means, which is selected in the first step, is selected in a second step for a DTMF signal transmission.

17. A voice transmitter according to claim 14, wherein the DTMF transmission control means comprises
   transmission-line quality monitoring control means for monitoring transmission quality of a transmission line, and for, depending on the transmission quality, controlling the first selector so that an output of the first voice-DTMF encoding means or that of the second voice-DTMF encoding means is selected in a first step; and
   input-signal quality monitoring control means for monitoring quality of an inputted audio signal and a DTMF signal, and for, depending on the quality, controlling the first selector so that an output of the DTMF encoding means, or that of the first or the second voice-DTMF encoding means, which is selected in the first step, is selected in a second step for a DTMF signal transmission.

18. A voice transmitter according to claim 14, wherein the DTMF transmission control means comprises
   transmission congestion state monitoring control means for monitoring a congestion state in the transmission, and for, depending on the congestion state, controlling the first selector so that an output of the first voice-DTMF encoding means or that of the second voice-DTMF encoding means is selected in a first step; and
   input-signal quality monitoring control means for monitoring quality of an audio signal and an inputted DTMF signal, and for, depending on the quality, controlling the first selector so that an output of the DTMF encoding means, or that of the first or the second voice-DTMF encoding means, which is selected in the first step, is selected in a second step for a DTMF signal transmission.

19. A voice transmitter according to claim 14, wherein the DTMF transmission control means is transmission-line quality monitoring control means for monitoring transmission quality of a transmission line, and for, depending on the detected level of the transmission quality, controlling the first selector so that an output is selected from any one of those including the first voice-DTMF encoding means, the second voice-DTMF encoding means, and the DTMF encoding means.

20. A voice transmitter according to claim 14, wherein the DTMF transmission control means is transmitter congestion state monitoring control means for monitoring a congestion state in the transmitter, and for, depending on the detected level of the congestion state, controlling the first selector so that an output is selected from any one of those including the first voice-DTMF encoding means, the second voice-DTMF encoding means, and the DTMF encoding means.

* * * * *